US009798462B2

(12) United States Patent
Kameyama

(10) Patent No.: US 9,798,462 B2
(45) Date of Patent: Oct. 24, 2017

(54) DISPLAY CONTROL APPARATUS, DISPLAY CONTROL METHOD, AND COMPUTER PROGRAM

(71) Applicant: Sony Corporation, Minato-ku (JP)

(72) Inventor: Naoki Kameyama, Nagano (JP)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 13/925,224

(22) Filed: Jun. 24, 2013

(65) Prior Publication Data
US 2014/0035845 A1    Feb. 6, 2014

(30) Foreign Application Priority Data

Aug. 1, 2012 (JP) ................. 2012-171092

(51) Int. Cl.
| | |
|---|---|
| G06F 3/0488 | (2013.01) |
| G06F 3/0354 | (2013.01) |
| G06F 3/041 | (2006.01) |
| G06F 3/01 | (2006.01) |
| G06F 3/0485 | (2013.01) |

(52) U.S. Cl.
CPC .......... *G06F 3/04886* (2013.01); *G06F 3/017* (2013.01); *G06F 3/03545* (2013.01); *G06F 3/03547* (2013.01); *G06F 3/041* (2013.01); *G06F 3/0416* (2013.01); *G06F 3/0485* (2013.01); *G06F 3/04883* (2013.01); *G06F 2203/04101* (2013.01); *G06F 2203/04104* (2013.01)

(58) Field of Classification Search
CPC ...... G06F 3/0485; G06F 3/041–3/0412; G06F 3/0416; G06F 3/0488–3/04886; G06F 3/03545; G06F 3/03547; G06F 2203/04101; G06F 2203/04104

USPC .......................................................... 345/173
See application file for complete search history.

(56) References Cited

U.S. PATENT DOCUMENTS

| | | | | |
|---|---|---|---|---|
| 5,675,755 A | * | 10/1997 | Trueblood ............ | G06F 3/0481 715/791 |
| 2004/0150630 A1 | * | 8/2004 | Hinckley et al. ............. | 345/173 |
| 2004/0263486 A1 | * | 12/2004 | Seni ............................... | 345/173 |

(Continued)

FOREIGN PATENT DOCUMENTS

CN        102099775 A    6/2011

OTHER PUBLICATIONS

Office Action issued in Chinese Application No. 201310312209.7, dated Dec. 28, 2016, with English translation. (30 pages).

*Primary Examiner* — David Tung
(74) *Attorney, Agent, or Firm* — Oblon, McClelland, Maier & Neustadt, L.L.P.

(57) ABSTRACT

There is provided a display control apparatus including a detection section which detects contact or proximity of a member with or to a display section which displays information, and a display control section which controls displaying of the information on the display section. In a state where the detection section detects contact with or proximity to a predetermined region of the display section continuously performed by a first member for a predetermined time period, the display control section controls scrolling display on the display section according to whether or not the detection section detects contact with or proximity to the display section performed by a second member different from the first member.

19 Claims, 20 Drawing Sheets

(56) References Cited

U.S. PATENT DOCUMENTS

| | | | |
|---|---|---|---|
| 2006/0239561 A1* | 10/2006 | Huapaya et al. | 382/187 |
| 2007/0097093 A1* | 5/2007 | Ohshita et al. | 345/173 |
| 2009/0295727 A1* | 12/2009 | Tseng | G06F 3/0488 345/163 |
| 2010/0283753 A1* | 11/2010 | Ohshita | 345/173 |
| 2011/0126097 A1* | 5/2011 | Isono | 715/702 |
| 2012/0154295 A1* | 6/2012 | Hinckley et al. | 345/173 |
| 2013/0222238 A1* | 8/2013 | Sliger | 345/157 |

\* cited by examiner

DISPLAY CONTROL APPARATUS, DISPLAY CONTROL METHOD, AND COMPUTER PROGRAM

BACKGROUND

The present disclosure relates to a display control apparatus, a display control method, and a computer program.

A terminal is known in which handwriting input on a screen can be performed by bringing a stick-shaped member such as a stylus into contact with the screen. Such a terminal appropriately detects a position at which the member contacts the screen to thereby enhance the operability and the reliability of the handwriting input performed by a user of the terminal (see JP Hei 7-064704A, for example).

SUMMARY

The terminal supporting the handwriting input on the screen as described above is desired to provide the user with a write feeling similar to that in handwriting on paper. Such a terminal, however, might have a smaller range of displaying information on the screen than a range allowing information to be written. In consideration of such a case, the terminal has a function of scrolling a region for writing information, and typically scrolls the region by detecting manipulation caused by movement of the user's hand in contact with the screen.

However, when the user handwrites using the stick-shaped member such as the stylus, the handwriting-input-supporting terminal which has the function of scrolling a region for information writing might wrongly detect movement, on the screen, of the user's hand or finger or the member in contact with the screen, as scrolling manipulation. It is necessary that the terminal should control the scrolling so that the scrolling is prohibited in a scene where the user does not wish to scroll the screen. At this time, there is a demand for manipulation natural to the user.

Hence in the present disclosure, it is desirable to provide a display control apparatus, a display control method, and a computer program which make it possible to enhance user-friendliness in handwriting input on the screen and to provide a write feeling similar to that in handwriting on paper.

According to an embodiment of the present disclosure, there is provided a display control apparatus including a detection section which detects contact or proximity of a member with or to a display section which displays information, and a display control section which controls displaying of the information on the display section. In a state where the detection section detects contact with or proximity to a predetermined region of the display section continuously performed by a first member for a predetermined time period, the display control section controls scrolling display on the display section according to whether or not the detection section detects contact with or proximity to the display section performed by a second member different from the first member.

According to an embodiment of the present disclosure, there is provided a display control method including detecting contact or proximity of a member with or to a display section which displays information, and controlling displaying of the information on the display section. In the display control step, in a state where contact with or proximity to a predetermined region of the display section continuously performed by a first member for a predetermined time period is detected in the detection step, scrolling display on the display section is controlled according to whether or not contact with or proximity to the display section is controlled according to whether or not contact with or proximity to the display section performed by a second member different from the first member is detected in the detection step.

According to an embodiment of the present disclosure, there is provided a computer program causing a computer to execute detecting contact or proximity of a member with or to a display section which displays information, and controlling displaying of the information on the display section. In the display control step, in a state where contact with or proximity to a predetermined region of the display section continuously performed by a first member for a predetermined time period is detected in the detection step, scrolling display on the display section is controlled according to whether or not contact with or proximity to the display section performed by a second member different from the first member is detected in the detection step.

According to the embodiment of the present disclosure as described above, it is possible to provide a display control apparatus, a display control method, and a computer program, which are novel and improved, and can enhance user-friendliness in handwriting input on the screen.

DETAILED DESCRIPTION OF THE EMBODIMENT

Figure 1:
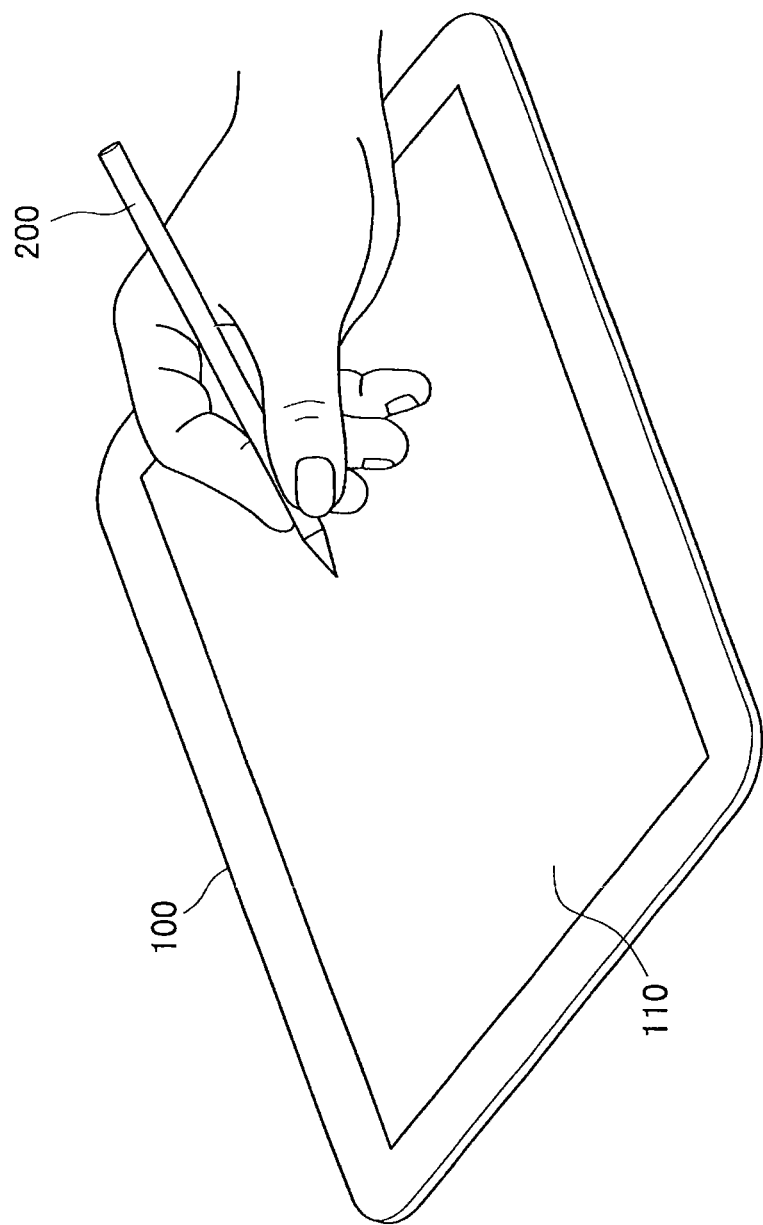
FIG. 1 is an explanatory diagram illustrating an appearance of an information processing apparatus 100 according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

<1. Embodiment of present disclosure>
[Appearance example of information processing apparatus]
[Functional configuration example of information processing apparatus]
[Overview of functions]
[Specific operation example]
[Modifications of information processing apparatus]
<2. Conclusion>

1. Embodiment of Present Disclosure

[Appearance Example of Information Processing Apparatus]

Firstly, an appearance example of an image processing apparatus according to an embodiment of the present disclosure will be described with reference to the drawings. FIG. 1 is an explanatory diagram illustrating an appearance of an information processing apparatus 100 according to an embodiment of the present disclosure. Hereinbelow, the appearance of the information processing apparatus 100 according to an embodiment of the present disclosure will be described by using FIG. 1.

As illustrated in FIG. 1, the information processing apparatus 100 according to an embodiment of the present disclosure is a tablet apparatus. The information processing apparatus 100 includes a display section 110 having a screen size of approximately 7 inches to 10 inches, for example. The display section 110 is provided with a touch panel. When a user of the information processing apparatus 100A touches a display surface of the display section 110 with his/her finger or the like, the information processing apparatus 100 can thereby be manipulated. In addition, when a tip end portion of a stylus 200 is brought into contact with the display surface of the display section 110, handwriting input of a letter to the information processing apparatus 100 can thereby be performed. Note that the form of the touch panel provided on the display surface of the display section 110 is not limited to a particular form. As long as handwriting input of a letter on the information processing apparatus 100 is enabled by bringing the tip end portion of the stylus 200 into contact with the display surface of the display section 110, any touch panel may be used.

The following description is given on the assumption that the information processing apparatus 100 is the tablet apparatus as illustrated in FIG. 1. However, the present disclosure is not limited to the example. It goes without saying that as long as an apparatus enables manipulation and handwriting input of a letter to the display surface of the display section 110 as described above, technology to be described below is also applicable to the apparatus.

The appearance example of the information processing apparatus 100 according to an embodiment of the present disclosure has heretofore been described by using FIG. 1. Next, a description is given of a functional configuration example of the information processing apparatus 100 according to an embodiment of the present disclosure.

[Functional Configuration Example of Information Processing Apparatus]

Figure 2:
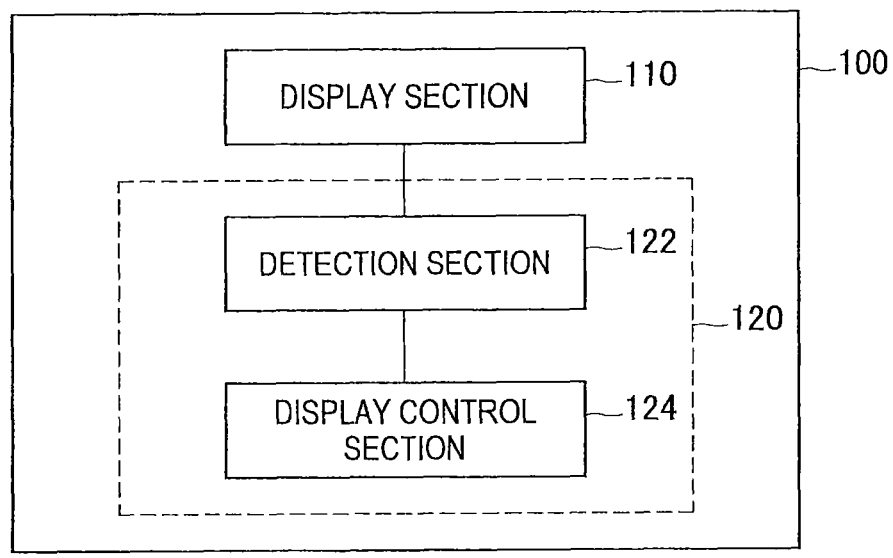
FIG. 2 is an explanatory diagram illustrating a functional configuration example of the information processing apparatus 100 according to an embodiment of the present disclosure.

FIG. 2 is an explanatory diagram illustrating the functional configuration example of the information processing apparatus 100 according to an embodiment of the present disclosure. Hereinbelow, the functional configuration example of the information processing apparatus 100 according to an embodiment of the present disclosure will be described by using FIG. 2.

As illustrated in FIG. 2, the information processing apparatus 100 according to an embodiment of the present disclosure includes the display section 110 and a control section 120.

The display section 110 displays various pieces of information. The display section 110 is formed by a thin flat display panel such as a liquid crystal display panel, or an organic EL display panel. In addition, the display surface of the display section 110 is provided with the touch panel (not shown). Since the display surface of the display section 110 is provided with the touch panel, it is possible to manipulate the information processing apparatus 100 by touching the display surface of the display section 110 with the finger of the user and to perform handwriting input of a letter to the information processing apparatus 100 by bringing the tip end portion of the stylus 200 into contact with the display surface of the display section 110, as described above.

The control section 120 controls an operation of the information processing apparatus 100. Examples of the control of the control section 120 over the operation of the information processing apparatus 100 includes, control over the content of information to be displayed on the display section 110 and control in accordance with the user's manipulation of the information processing apparatus 100.

As illustrated in FIG. 2, the control section 120 included in the information processing apparatus 100 according to an embodiment of the present disclosure includes a detection section 122 and a display control section 124.

When the hand of the user or the tip end of the stylus 200 contacts the display surface of the display section 110, the detection section 122 detects a position of the contact and the area or the contact. When successfully acquiring information on the contact position of the user's hand or the tip end of the stylus 200 and on the area of the contact, the detection section 122 supplies the display control section 124 with the information on the contact position and the area of the contact.

The display control section 124 controls information displaying on the display section 110. For example, when information is written on the display section 110 by using the stylus 200, the display control section 124 controls the display in accordance with a trajectory of the tip end of the stylus 200. The display control section 124 controls not only the information to be displayed on the display section 110 but also states of enabling and disabling scrolling display on the display section 110. In the present embodiment, the display control section 124 controls states of enabling and disabling scrolling display on the display section 110 based on the contact position information provided by the detection section 122.

The control section 120 included in the information processing apparatus 100 according to an embodiment of the present disclosure has the configuration as illustrated in FIG. 2, and thereby can control the display on the display section 110 in accordance with a contact state of the display surface of the display section 110. By executing the display control over the display section 110 in accordance with the contact state of the display surface of the display section 110, the control section 120 can enhance user-friendliness in handwriting input and thus provide a feeling similar to that in writing on paper.

The functional configuration example of the information processing apparatus 100 according to an embodiment of the present disclosure has heretofore been described by using FIG. 2. Next, a description is given of an overview of an operation of the control section 120 included in the information processing apparatus 100 according to an embodiment of the present disclosure.

[Overview of Functions]

Figure 3:
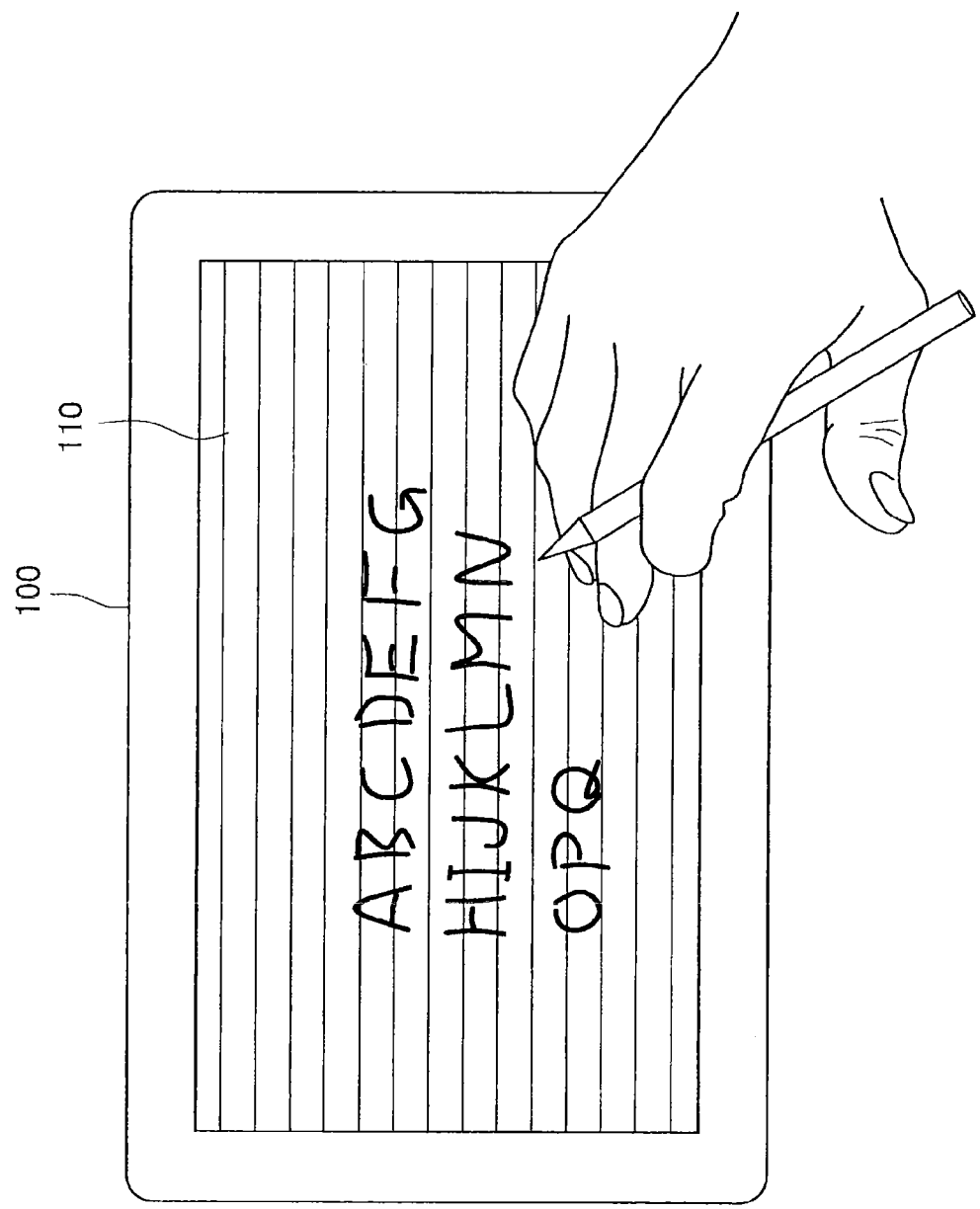
FIG. 3 is an explanatory diagram illustrating a state where a user performs handwriting input on the information processing apparatus 100 according to an embodiment of the present disclosure.

FIG. 3 is an explanatory diagram illustrating a state where the user performs handwriting input on the information processing apparatus 100 according to an embodiment of the present disclosure. When performing the handwriting input on the information processing apparatus 100, the user writes on the display section 110 by using the stylus 200 as illustrated in FIG. 3, with the information processing apparatus 100 placed on the desk or the like. When letters are written on the display section 110 by using the stylus 200, the display control section 124 performs display on the display section 110 in accordance with a trajectory of the tip end of the stylus 200. Under the control of the display control section 124, the display section 110 displays the letters inputted by the handwriting as illustrated in FIG. 3.

As described above, the information processing apparatus 100 includes the display section 110 having the screen size of approximately 7 inches to 10 inches, for example. In some cases, the screen size is not large enough to display all of information the user wishes to write. Hence, the information processing apparatus 100 has a function of scrolling a write region.

Figure 4:
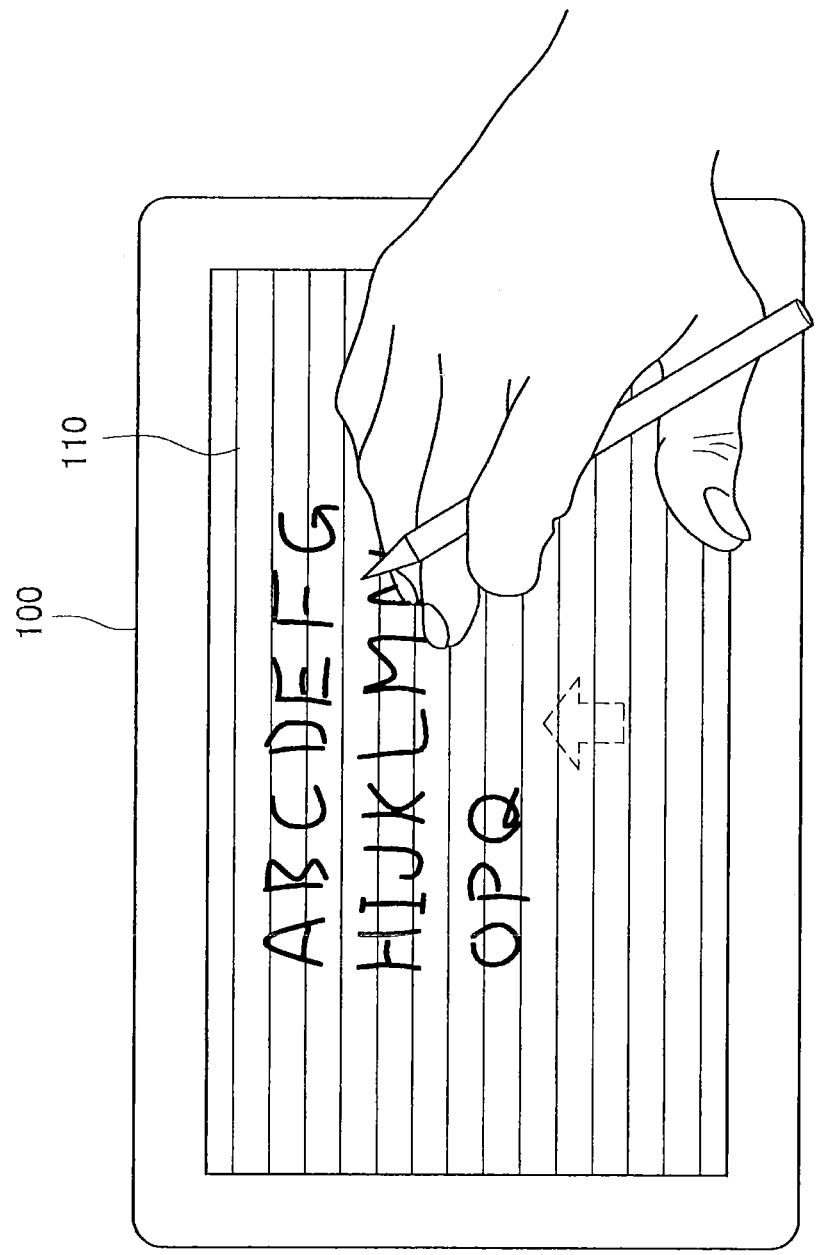
FIG. 4 is an explanatory diagram illustrating a state where the user performs handwriting input on the information processing apparatus 100 according to an embodiment of the present disclosure.

FIG. 4 is an explanatory diagram illustrating a state where the user performs handwriting input on the information processing apparatus 100 according to an embodiment of the present disclosure. FIG. 4 illustrates a case where, in a state where letters are handwritten as in FIG. 3, the user moves his/her hand (the action is also referred to as sliding manipulation) in contact with the display surface of the display section 110 toward an upper part of the information processing apparatus 100. The display control section 124 is capable of: detecting the sliding manipulation performed by the user; and scrolling the write region displayed in the display section 110. Such a scrolling operation involved with the sliding manipulation is similar to an action of manually sliding paper placed on the desk, and serves as an interface through which the user can perform intuitive manipulation.

Note that the display control section 124 may discriminate between the write manipulation using the stylus 200 and the sliding manipulation, for example, based on the area of contact with the display section 110, or by detecting a difference in capacitance change between contact of the tip end portion of the stylus 200 and contact of the user's hand.

The scrolling operation involved with the sliding manipulation can provide the user with an intuitive manipulation, but has the following evil, if scrolling control is not taken into consideration. Specifically, scrolling occurs in the course of handwriting input, and thus the handwriting input becomes difficult on the contrary.

Figure 5:
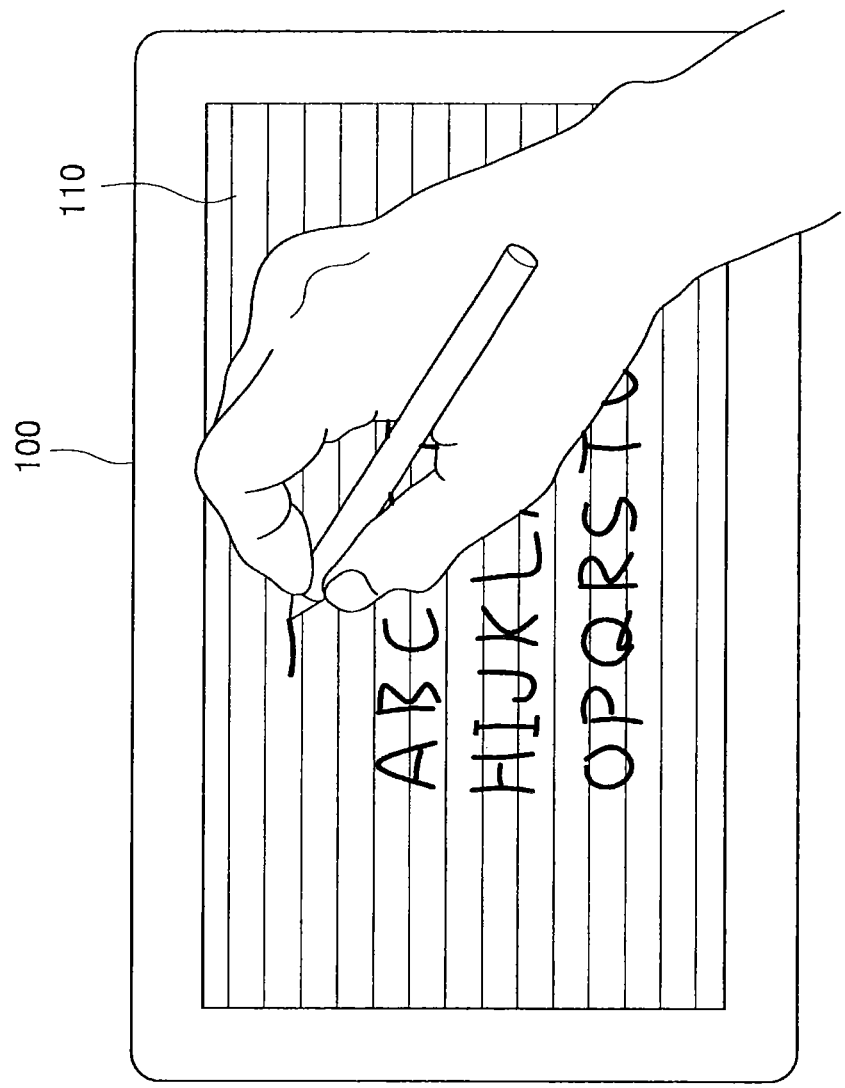
FIG. 5 is an explanatory diagram illustrating a state where the user performs handwriting input on the information processing apparatus 100 according to an embodiment of the present disclosure.
Figure 6:
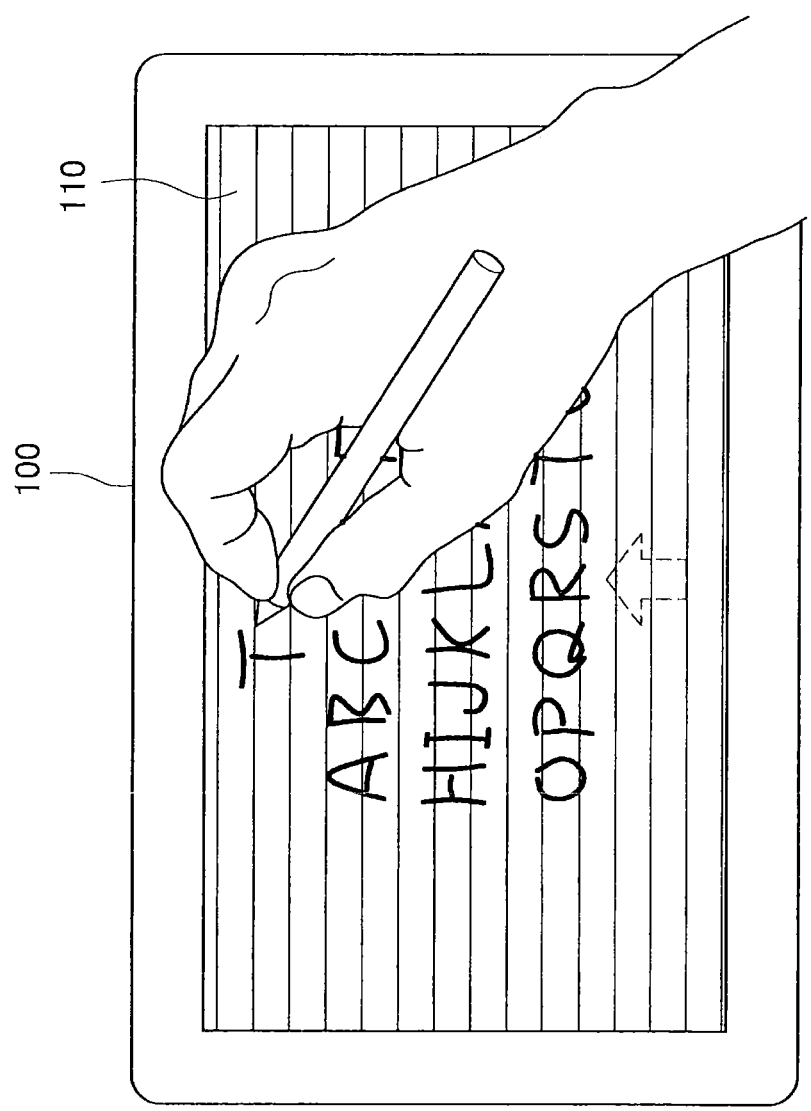
FIG. 6 is an explanatory diagram illustrating a state where the user performs handwriting input on the information processing apparatus 100 according to an embodiment of the present disclosure.

FIGS. 5 and 6 are explanatory diagrams each illustrating a state where the user performs the handwriting input on the information processing apparatus 100 according to an embodiment of the present disclosure. Hereinbelow, by using FIGS. 5 and 6, a description is given of the case where the handwriting input is made difficult when the user performs the handwriting input on the information processing apparatus 100.

Suppose a case where, as in FIG. 5, when the user performs the handwriting input on the information processing apparatus 100, the user touches the display section 110 with his/her hand and further moves the hand while keeping the touch on the display section 110. In such a case, it is conceivable that the display control section 124 might sense the movement of the hand as the sliding manipulation of the display section 110 and scroll the write region as in FIG. 6. As described above, the scrolling operation in the course of user's handwriting input deteriorates the user-friendliness in the handwriting input to the information processing apparatus 100.

Hence, the information processing apparatus 100 according to the present embodiment in advance sets a predetermined region in the display section 110. If the user touches the region, the display control section 124 controls the display so that the scrolling operation is disabled. In the following description, the predetermined region is also referred to as a "holding region" and contact manipulation of the holding region which is continuously performed by the user for a predetermined time period or longer is also referred to as "holding manipulation". In this way, the display control section 124 controls the scrolling operation based on whether or not the contact manipulation of the holding region is performed, the contact manipulation continuing for the predetermined time period or longer. Thereby, the information processing apparatus 100 according to an embodiment of the present disclosure can implement the interface capable of providing the user with intuitive manipulation similar to an action of manually holding paper placed on the desk.

The description has heretofore been given of the overview of the operation of the control section 120 included in the information processing apparatus 100 according to an embodiment of the present disclosure. Subsequently, a description is given of a specific operation example of the information processing apparatus 100 according to an embodiment of the present disclosure.

[Specific Operation Example]

Figure 7:
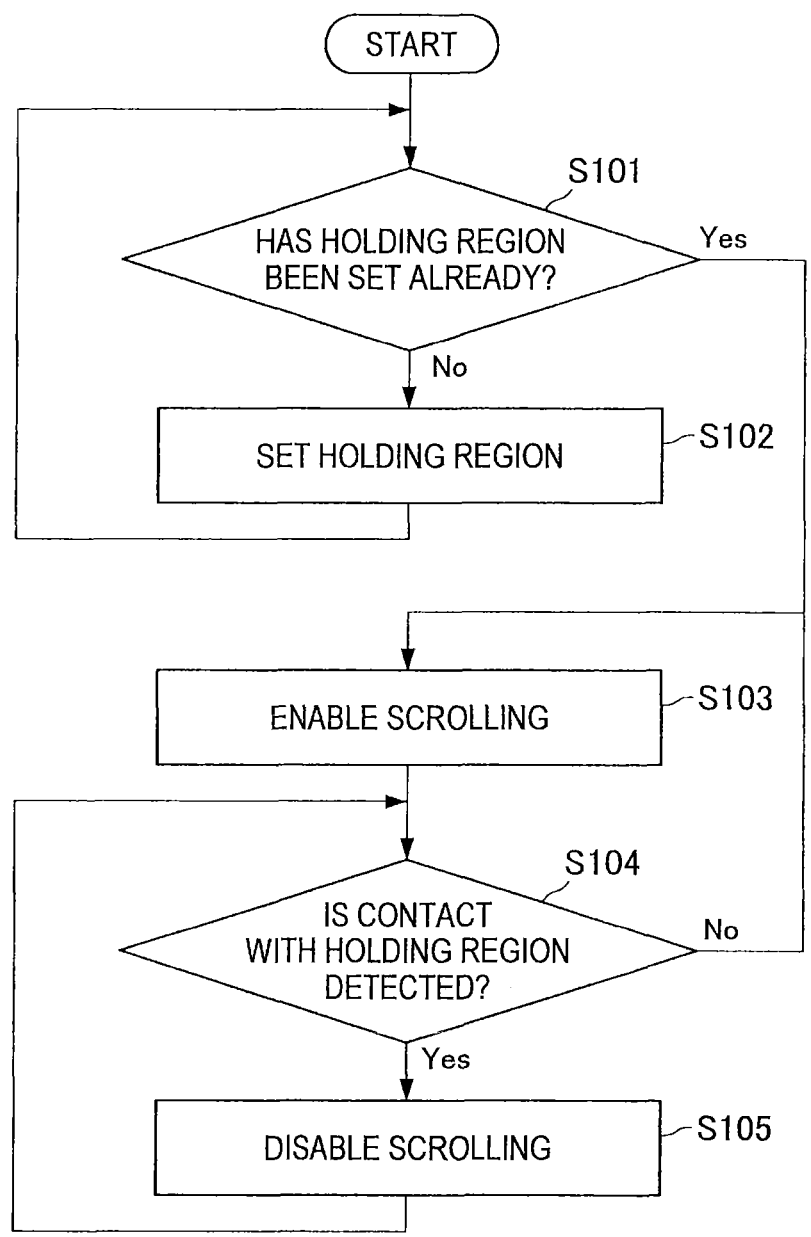
FIG. 7 is a flowchart illustrating an operation example of the information processing apparatus 100 according to an embodiment of the present disclosure.

FIG. 7 is a flowchart illustrating the operation example of the information processing apparatus 100 according to an embodiment of the present disclosure. The flowchart in FIG. 7 illustrates an example of control by the display control section 124 over the scrolling operation of the display section 110. Hereinbelow, the operation example of the information processing apparatus 100 according to an embodiment of the present disclosure will be described by using FIG. 7.

Firstly, prior to the control over the scrolling operation of the display section 110, the display control section 124 judges whether the holding region has already been set in the display section 110 (Step S101). If it is judged in Step S101 that the holding region is not set in the display section 110, the display control section 124 sets the holding region in the display section 110 (Step S102). After setting the holding region in the display section 110, the display control section 124 moves back again to the judgment in Step S101 for the judgment.

To set the holding region, the display control section 124 can use various methods. For example, the display control section 124 may set a particular region of the display section 110 as the holding region, or may learn a position at which the user touches in the holding manipulation to automatically set the holding region from the result of the learning, as will be described later.

When designating a particular region of the display section 110, the display control section 124 may cause the user to set his/her dominant hand through a menu screen or the like, and set, as the holding region, a particular region of the display section 110 which is located on the opposite side from the dominant hand. When causing the user to set the region, the display control section 124 may cause the user to designate a holding region as the user likes and set the designated region as the holding region. The display control section 124 may cause the user to designate, for example, one to several points on the display section 110 and set, as the holding region, a region extending from the point or points to the end of the display section 110. The display control section 124 may also cause the user to designate a free-form curve and set, as the holding region, a region extending from the curve to the end of the display section 110. Alternatively, the display control section 124 may also cause the user to designate a particular region as the holding region.

On the other hand, if it is judged in Step S101 described above that the holding region has already been set in the display section 110, the display control section 124 firstly enables the scrolling operation of the display section 110 (Step S103). Then, the display control section 124 judges whether the detection section 122 detects contact with the holding region continuing for the predetermined time period or longer (Step S104). Here, the contact continuing for the predetermined time period or longer is set as a branching condition so as to cause the display control section 124 to definitely judge that the user holds the display surface of the display section 110 like the handwriting on paper.

When it is judged in Step S104 as described above that the detection section 122 detects the contact with the holding region set in the display section 110 which continues for the predetermined time period or longer, the display control section 124 disables the scrolling operation of the display section 110 (Step S105). After disabling the scrolling operation of the display section 110 in Step S105, the display control section 124 moves back to Step S104 described above for the judgment processing. On the other hand, if it is judged in Step S104 that the detection section 122 does not detect the contact with the holding region set in the display section 110 which continues for the predetermined time period or longer, the display control section 124 moves back to Step S104 described above for the judgment processing, with the scrolling operation of the display section 110 kept enabled.

The operation example of the information processing apparatus 100 according to an embodiment of the present disclosure has been heretofore described by using FIG. 7. By executing the operation as illustrated in FIG. 7, the information processing apparatus 100 according to an embodiment of the present disclosure can implement the interface capable of providing the user with the intuitive manipulation similar to the action of manually holding paper placed on the desk.

Figure 8:
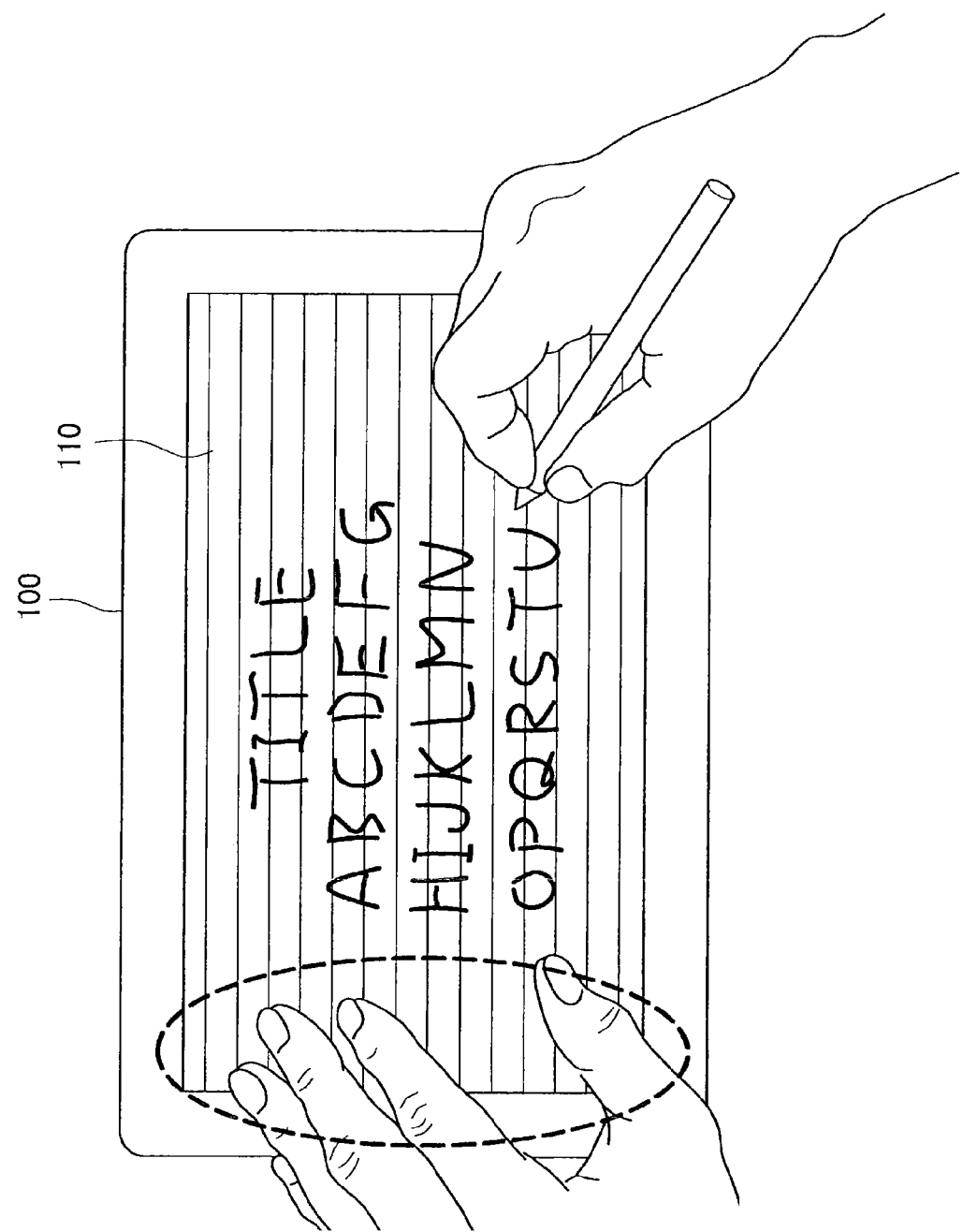
FIG. 8 is an explanatory diagram illustrating a state where the user performs handwriting input on the information processing apparatus 100 according to an embodiment of the present disclosure.

FIG. 8 is an explanatory diagram illustrating a state where the user performs handwriting input on the information processing apparatus 100 according to an embodiment of the present disclosure. FIG. 8 illustrates a state where the user touches the holding region set along a left side of the display section 110. As illustrated in FIG. 8, when the user touches the holding region, the information processing apparatus 100 can thereby control the display on the display section 110 so that the scrolling operation is disabled.

Here, the holding region set by the display control section 124 will be illustrated. FIGS. 9 to 14 are explanatory diagrams each illustrating a holding region of the information processing apparatus 100 according to an embodiment of the present disclosure. Note that FIGS. 9 to 14 each illustrate the holding region set in the case where the user's dominant hand is the right hand.

Figure 9:
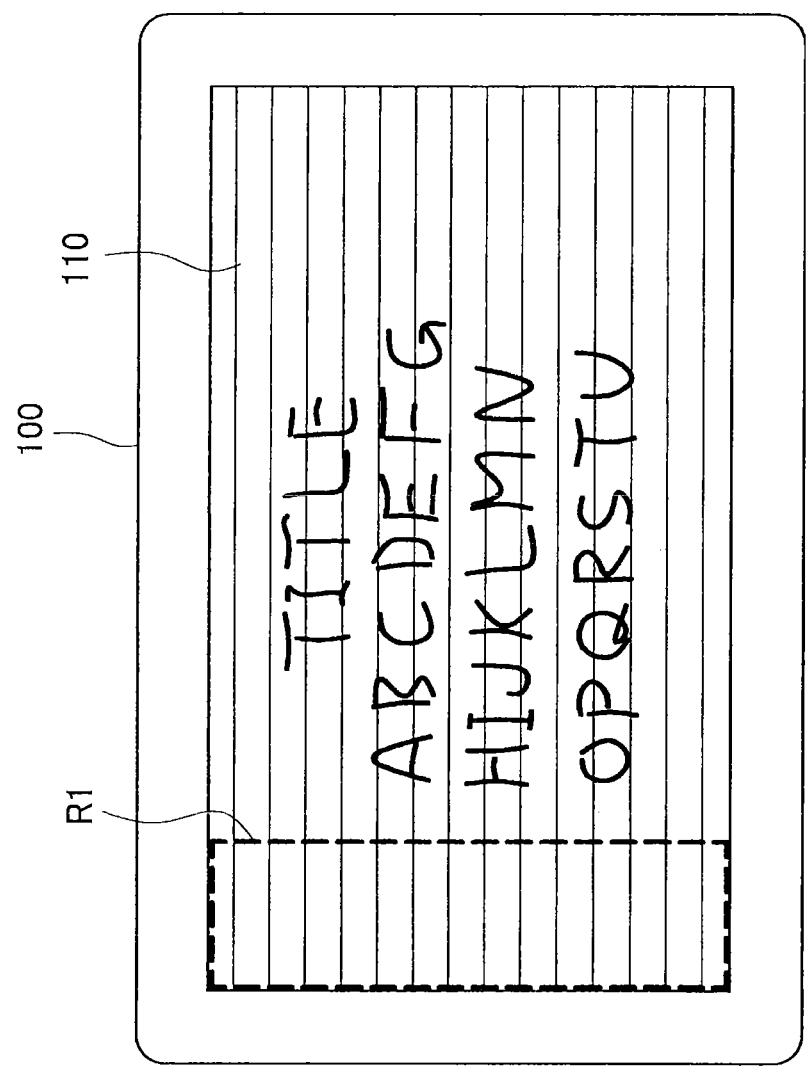
FIG. 9 is an explanatory diagram illustrating a holding region set in the information processing apparatus 100 according to an embodiment of the present disclosure.

FIG. 9 is the explanatory diagram illustrating the case where the display control section 124 sets a region R1 extending along the left side of the display section 110, as the holding region. When the user executes the holding manipulation on the region R1, the display control section 124 disables the scrolling operation of the display section 110.

Figure 10:
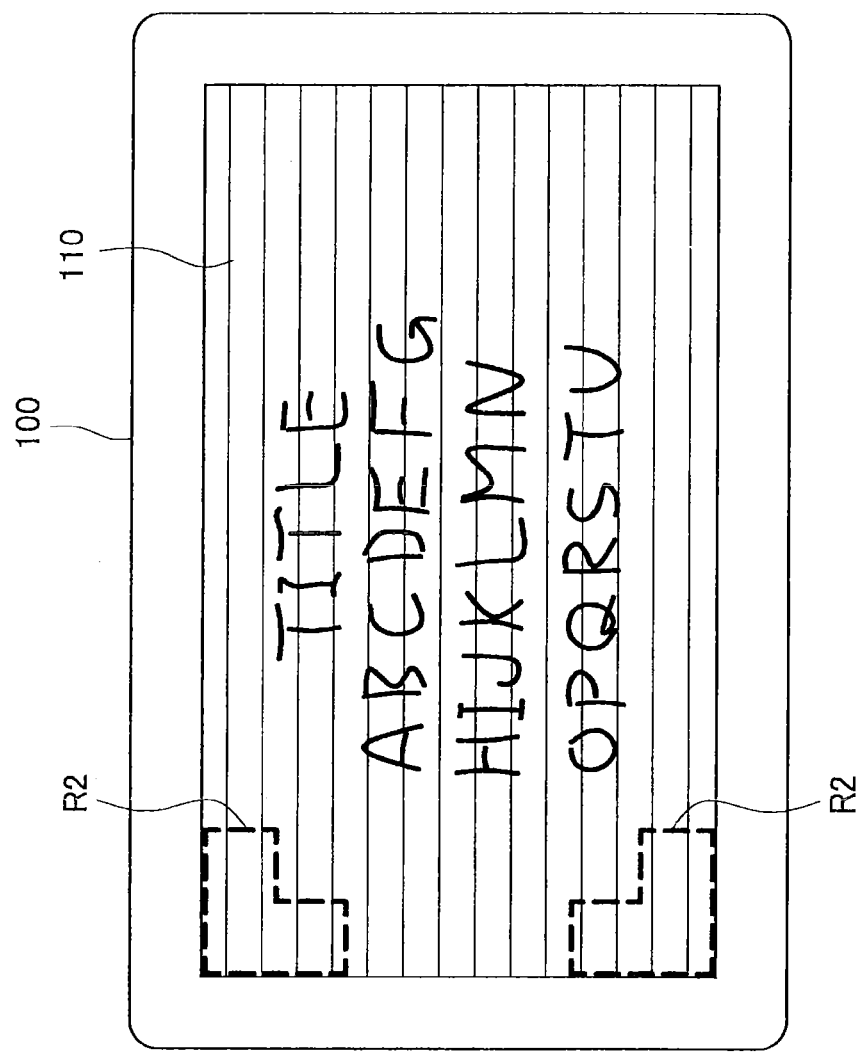
FIG. 10 is an explanatory diagram illustrating holding regions set in the information processing apparatus 100 according to an embodiment of the present disclosure.

FIG. 10 is an explanatory diagram illustrating the case where the display control section 124 sets, as the holding region, regions R2 respectively extending along an upper left corner and a lower left corner of the display section 110. When the user executes the holding manipulation on the regions R2, the display control section 124 disables the scrolling operation of the display section 110.

Figure 11:
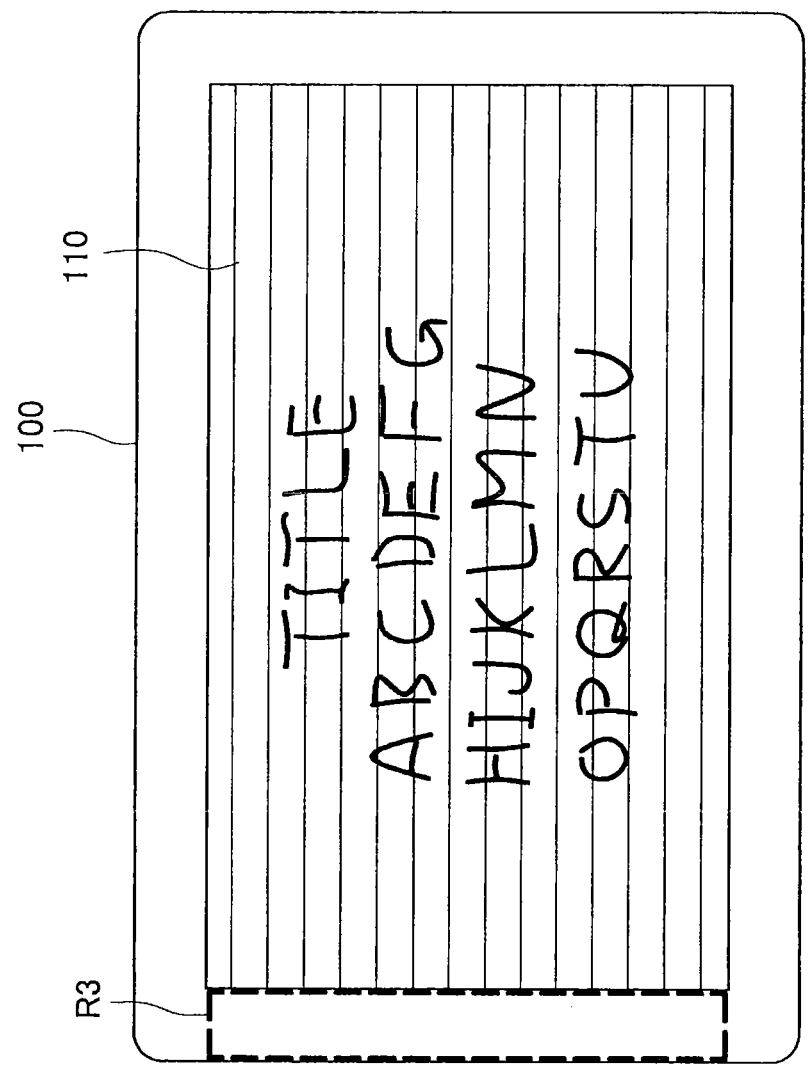
FIG. 11 is an explanatory diagram illustrating a holding region set in the information processing apparatus 100 according to an embodiment of the present disclosure.

The holding region does not have to be provided in the display section 110. FIG. 11 is an explanatory diagram illustrating the case where the display control section 124 sets, as the holding region, a region R3 extending along the left side of the information processing apparatus 100 and located outside the display section 110. When the user executes the holding manipulation on the region R3, the display control section 124 thereby disables the scrolling operation of the display section 110.

Figure 12:
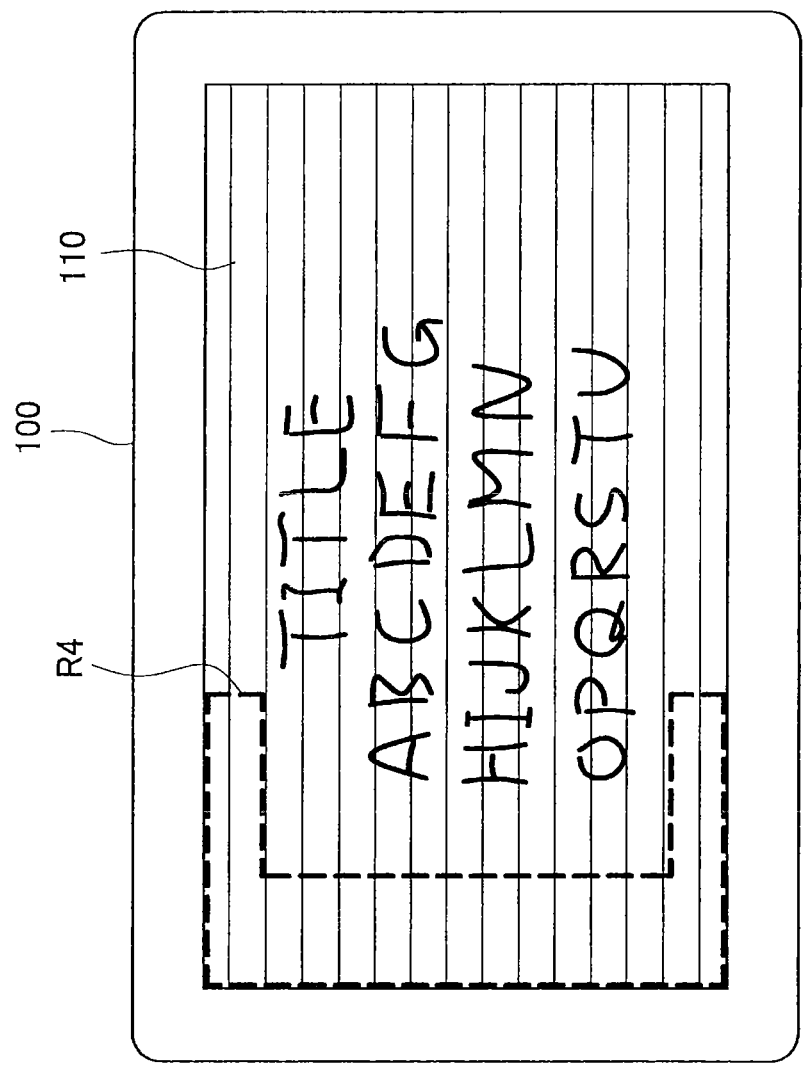
FIG. 12 is an explanatory diagram illustrating a holding region set in the information processing apparatus 100 according to an embodiment of the present disclosure.

The display control section 124 may automatically set the holding region in a region displaying no information in the display section 110. FIG. 12 is an explanatory diagram illustrating the case where the display control section 124 sets a region R4 as the holding region in a region displaying no information in the display section 110. The display control section 124 is capable of automatically setting the holding region in a region where any letter or any drawing is not inputted. For example, the display control section 124 may acquire coordinates of a region where a letter or a drawing is inputted and then set, as the holding region, another region which is a predetermined distance away from the region including the letter or the drawing. The display control section 124 does not have to set the entire region not including the inputted letter or drawing. The display control section 124 may limit the holding region to: a region opposite to the user's dominant hand in the region not including the letter or the drawing; a lower or lower part of the region opposite to the user's dominant hand; or the like. The display control section 124 sets the holding region in this way, and thereby the information processing apparatus 100 can enhance the user-friendliness in the handwriting input.

The information processing apparatus 100 may execute such an application that enables handwriting input in only part of the display section 110, instead of the entire display section 110. In such a case, the display control section 124 may set the holding region inside the region allowing the handwriting input.

Figure 13:
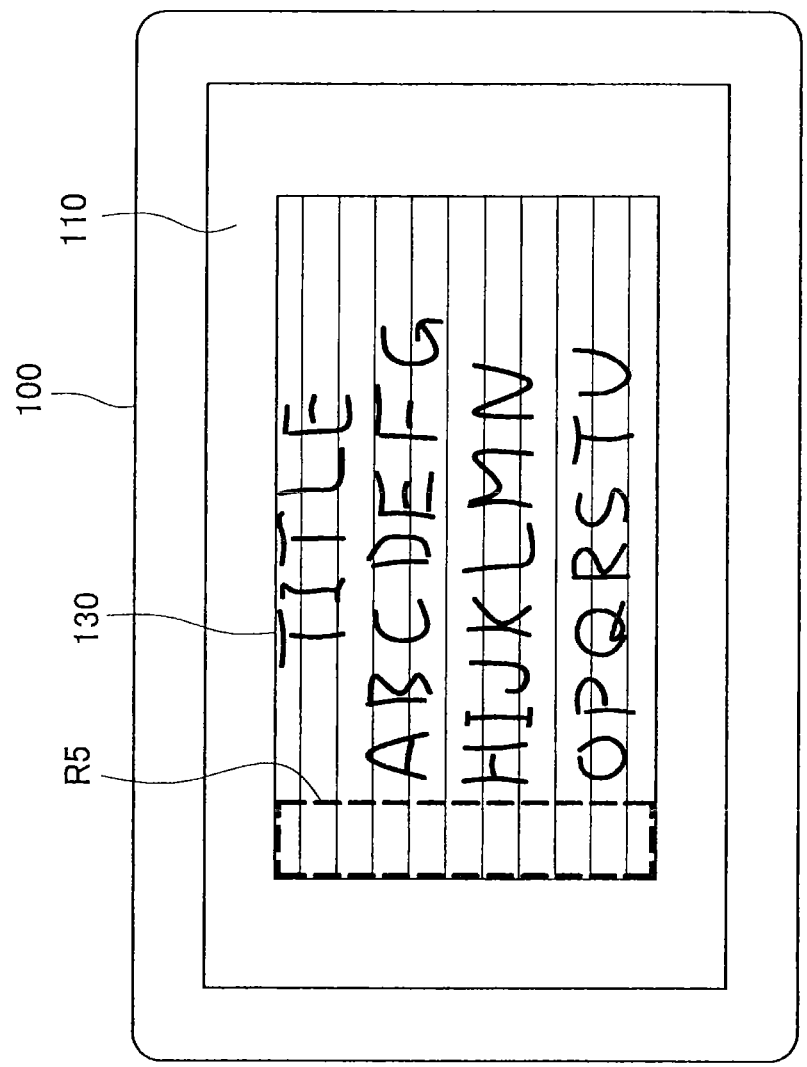
FIG. 13 is an explanatory diagram illustrating a holding region set in the information processing apparatus 100 according to an embodiment of the present disclosure.

FIG. 13 illustrates an explanatory diagram illustrating a case where the display control section 124 sets, as the holding region, a region R5 inside a handwriting input region 130 displayed in the display section 110, the region R5 extending along the left side of the handwriting input region 130. When the user executes the holding manipulation on the region R5, the display control section 124 thereby disables the scrolling operation of the display section 110. Note that the display control section 124 may disable only the scrolling operation of the handwriting input region 130 displayed in the display section 110 when the user executes the holding manipulation of the region R5.

Figure 14:
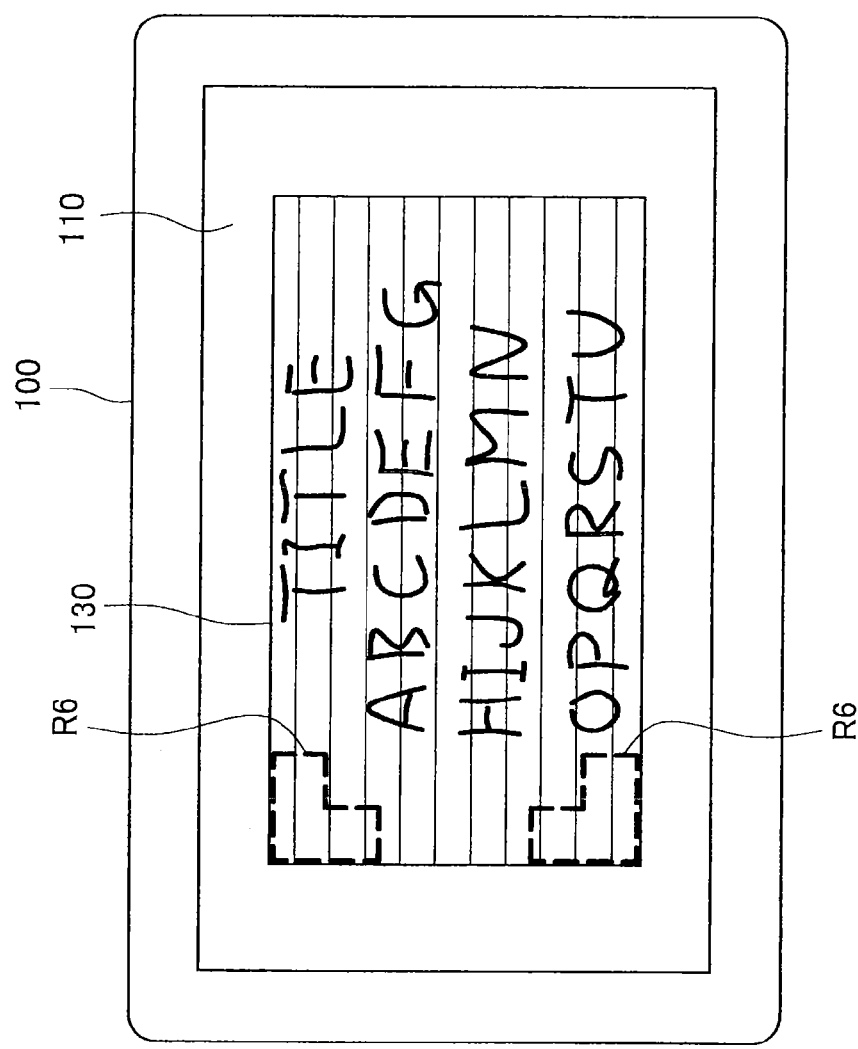
FIG. 14 is an explanatory diagram illustrating holding regions set in the information processing apparatus 100 according to an embodiment of the present disclosure.

FIG. 14 is an explanatory diagram illustrating the case where the display control section 124 sets, as the holding region, regions R6 inside the handwriting input region 130 displayed in the display section 110, the regions R6 respectively extending along an upper left corner and a lower left corner of the handwriting input region 130. When the user executes the holding manipulation on the region R6, the display control section 124 thereby disables the scrolling operation of the display section 110. Note that the display control section 124 may disable only the scrolling operation of the handwriting input region 130 displayed in the display section 110 when the user executes the holding manipulation of the regions R6.

By setting the holding region in the display section 110 in this way, the information processing apparatus 100 can enhance the user-friendliness of the handwriting input. Here, it is assumed that a user who is not accustomed to the holding manipulation of the holding region does not know which region should be held to disable the scrolling operation. To enhance such user's convenience, the information processing apparatus 100 according to an embodiment of the present disclosure may perform control so that the range of the holding region is explicitly displayed in the display section 110.

Figure 15:
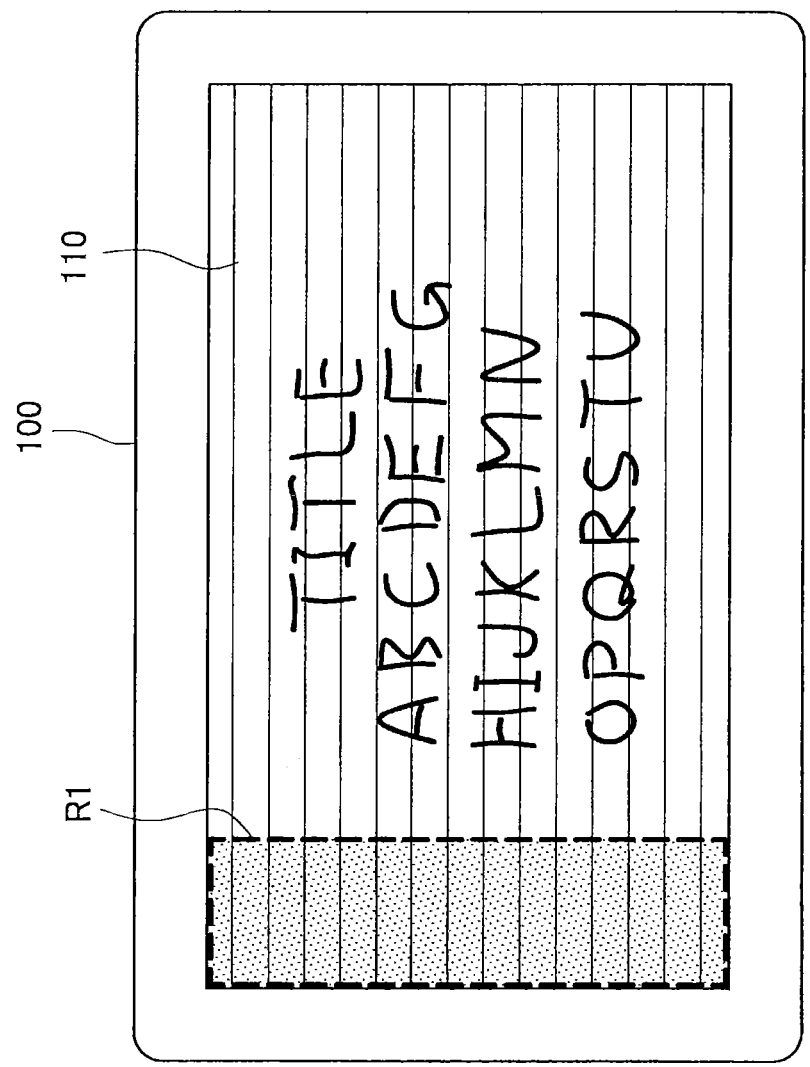
FIG. 15 is an explanatory diagram illustrating the holding region set in the information processing apparatus 100 according to an embodiment of the present disclosure.
Figure 17:
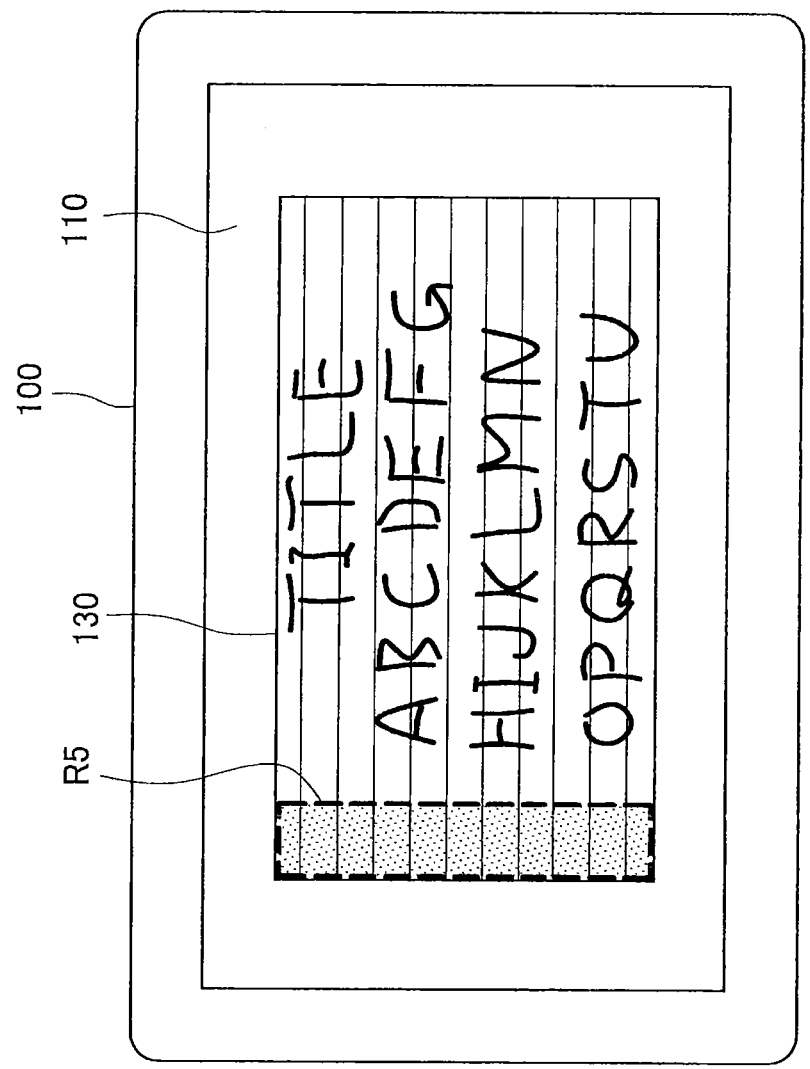
FIG. 17 is an explanatory diagram illustrating the holding region set in the information processing apparatus 100 according to an embodiment of the present disclosure.

FIGS. 15 and 17 are explanatory diagrams each illustrating a state where the display section 110 explicitly displays the range of the holding region set in the information processing apparatus 100 according to an embodiment of the present disclosure. Note that FIGS. 15 and 17 each illustrate the holding region set in the case where the user's dominant hand is the right hand.

FIG. 15 is the explanatory diagram illustrating a state where, when the region R1 extending along the left side of the display section 110 is set as the holding region as in FIG. 9, the range of the region R1 is explicitly displayed in the display section 110. When the user executes the holding manipulation on the region R1, the display control section 124 thereby disables the scrolling operation of the display section 110. By explicitly displaying the range of the region R1 in the display section 110, the display control section 124 can show the user which region should be held to result in the holding manipulation, in an easy-to-understand manner.

Figure 16:
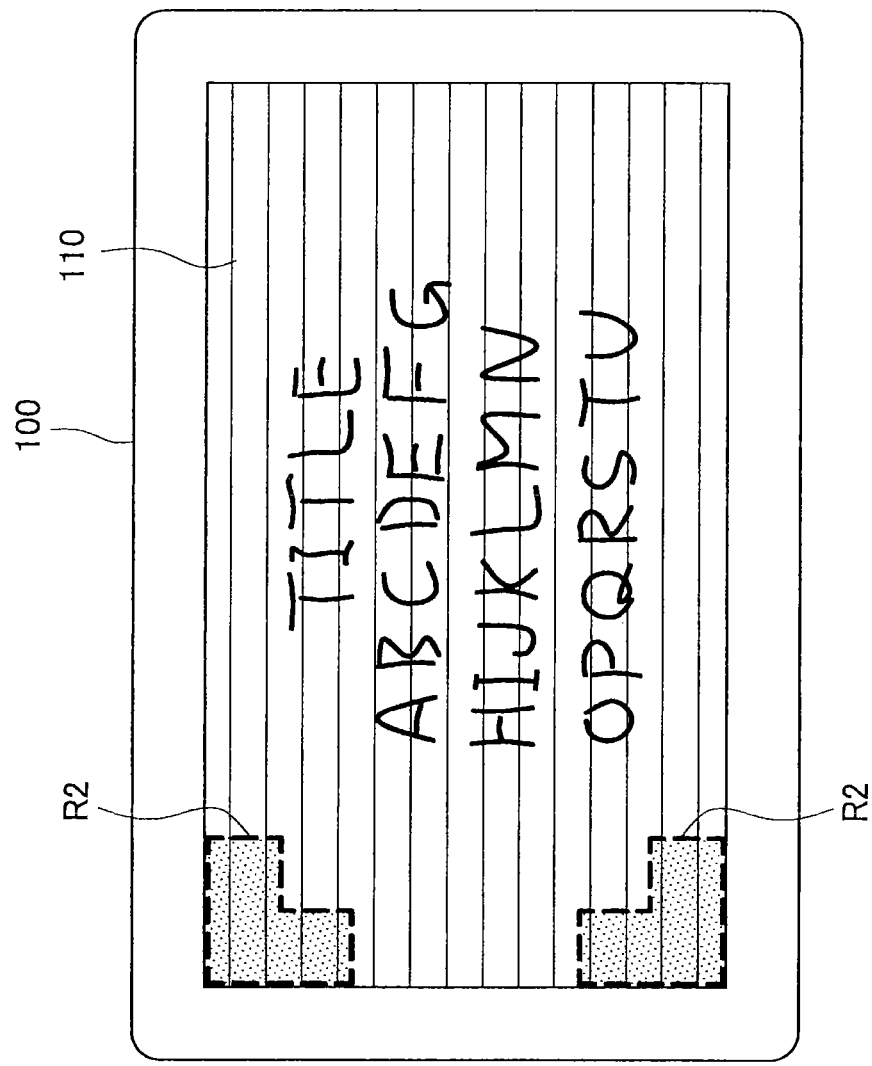
FIG. 16 is an explanatory diagram illustrating the holding regions set in the information processing apparatus 100 according to an embodiment of the present disclosure.

FIG. 16 is the explanatory diagram illustrating a state where, when the regions R2 extending along the upper and lower left corners of the display section 110 are set as the holding region as in FIG. 10, the ranges of the regions R2 are explicitly displayed in the display section 110. When the user executes the holding manipulation on the regions R2, the display control section 124 thereby disables the scrolling operation of the display section 110. By explicitly displaying the ranges of the regions R2 in the display section 110, the display control section 124 can show the user which region should be held to result in the holding manipulation, in the easy-to-understand manner.

FIG. 17 is the explanatory diagram illustrating a state where, when the region R5 is set as the holding region as in FIG. 13, the range of the region R5 is explicitly displayed in the display section 110, the region R5 being located inside the handwriting input region 130 displayed in the display section 110 and extending along the left side of the handwriting input region 130. When the user executes the holding manipulation on the region R5, the display control section 124 thereby disables the scrolling operation of the display section 110. By explicitly displaying the range of the region R5 in the display section 110, the display control section 124 can show the user which region should be held to result in the holding manipulation in the easy-to-understand manner.

The descriptions have heretofore been given of the examples of displaying the range of the holding region in the display section 110, the holding region being set for the information processing apparatus 100 according to an embodiment of the present disclosure. Next, a description is given of an operation example of the information processing apparatus 100 in the case where the touch panel provided on the display section 110 is capable of detecting contact of a member such as the stylus 200, independently from contact by the user with the hand.

For example, when the touch panel provided on the display section 110 is a touch panel, such as a touch panel employing an electromagnetic induction method, which is capable of identifying input using a member such as the stylus 200 while discriminating the input from contact by the user, the display control section 124 may perform the control in the following manner. Specifically, the scrolling is disabled: upon detection of the writing using the stylus 200; or upon detection of the writing using the stylus 200 and only in a predetermined time period after the end of the detection of the writing using the stylus 200. By controlling the scrolling operation in this manner, the display control section 124 does not hinder scrolling manipulation intentionally performed by the user with his/her hand or finger. In addition, by controlling the scrolling operation in this manner, the display control section 124 enables writing using the stylus 200 even in a set holding region. If the touch panel provided on the display section 110 is the touch panel capable of identifying input using a member such as the stylus 200, implementation of control of the scrolling operation independent from an application state is also made possible in the information processing apparatus 100 according to an embodiment of the present disclosure.

Note that also in a case other than the case of using the touch panel employing the electromagnetic induction method, the input using a member such as the stylus 200 may be identified while being discriminated from the contact by the hand of the user, based on the area of the contact, for example. The area of contact using a member such as the stylus 200 is minute, smaller than area of contact using the hand or the finger, and generally constant. Accordingly, when the area of contact is minute and does not change, the information processing apparatus 100 can judge that the contacting member is a member such as the stylus 200 used for the handwriting input.

On the other hand, if the touch panel provided on the display section 110 is a touch panel, such as a touch panel employing a capacitance method, a resistive film method, or an infrared rays method, which is not capable of identifying the input using a member such as the stylus 200 while discriminating the input from the contact by the user, the display control section 124 disables the scrolling operation as long as contact with the holding region is detected, as described above. By performing the control in this way, the display control section 124 disables the scrolling manipulation intentionally performed in a case other than the case of input using the stylus 200. In addition, the handwriting input performed on the holding region is restricted. If the touch panel provided on the display section 110 is the touch panel incapable of identifying the input using a member such as the stylus 200, implementation of the control of the scrolling operating on an application permitting the handwriting input using a member such as the stylus 200 is made possible in the information processing apparatus 100 according to an embodiment of the present disclosure.

Figure 18:
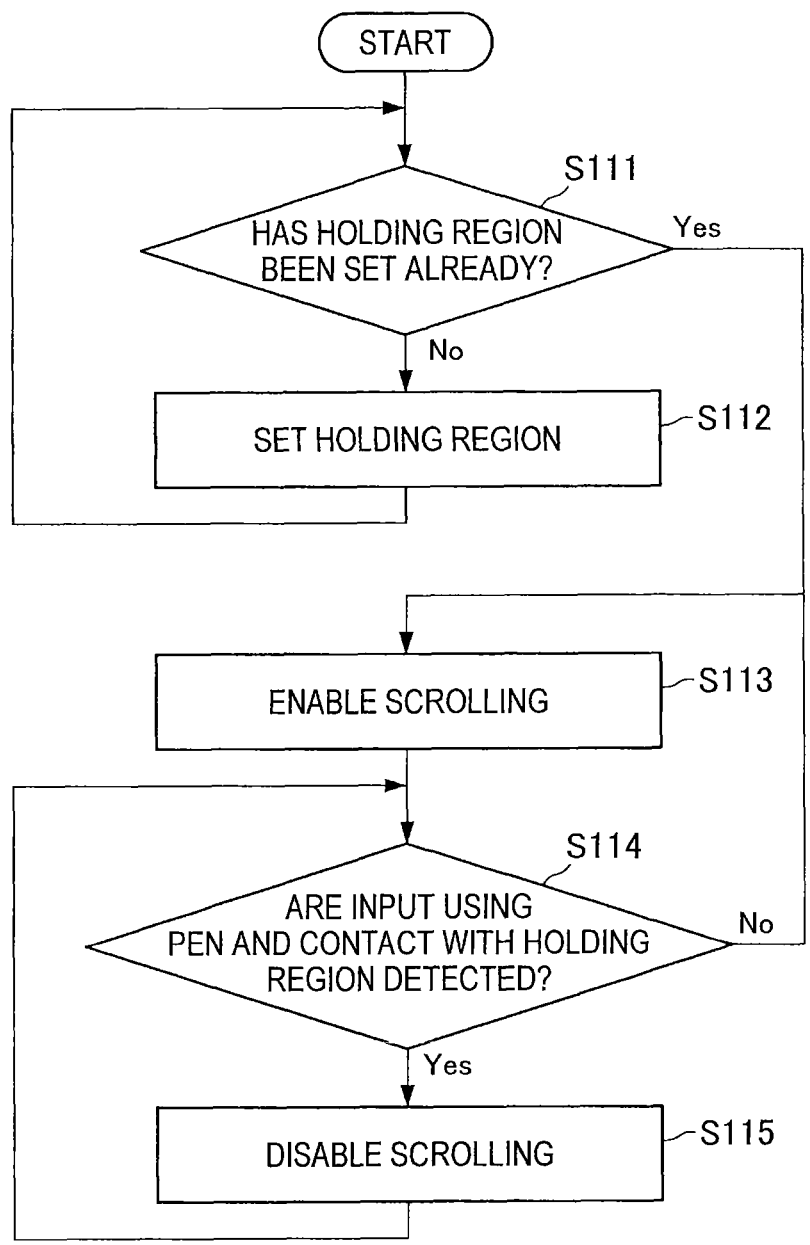
FIG. 18 is a flowchart illustrating an operation example of the information processing apparatus 100 according to an embodiment of the present disclosure.

FIG. 18 is a flowchart illustrating an operation example of the information processing apparatus 100 according to an embodiment of the present disclosure. FIG. 18 illustrates an example of scrolling operation control by the display control section 124 in the case where the touch panel provided on the display section 110 is the touch panel capable of identifying the input using a member such as the stylus 200. Hereinbelow, the operation example of the information processing apparatus 100 according to an embodiment of the present disclosure will be described by using FIG. 18.

FIG. 18 is different from the flowchart illustrated in the flowchart in FIG. 7 only in the content of the judgment processing in Step S114. Accordingly, a description is given here of the content of Step S114.

The display control section 124 judges whether the detection section 122 detects input using the stylus 200 and contact with the set holding region (Step S114). When it is judged in Step S114 described above that the detection section 122 detects the input using the stylus 200 and the contact with the set holding region, the display control section 124 thereby disables the scrolling operation of the display section 110 (Step S115). After the scrolling operation of the display section 110 is disabled in Step S115, the display control section 124 moves back to Step S114 for the judgment processing. On the other hand, when it is judged in Step S114 described above that the detection section 122 does not detect the input using the stylus 200 or does not detect the contact with the set holding region, the display control section 124 moves back to Step S114 for the judgment processing, with the scrolling operation of the display section 110 kept enabled.

If the touch panel provided on the display section 110 is the touch panel capable of identifying the input using a member such as the stylus 200, the display control section 124 can control the scrolling operation according to whether or not the input using the stylus 200 is performed.

[Modifications of Information Processing Apparatus]

Figure 19:
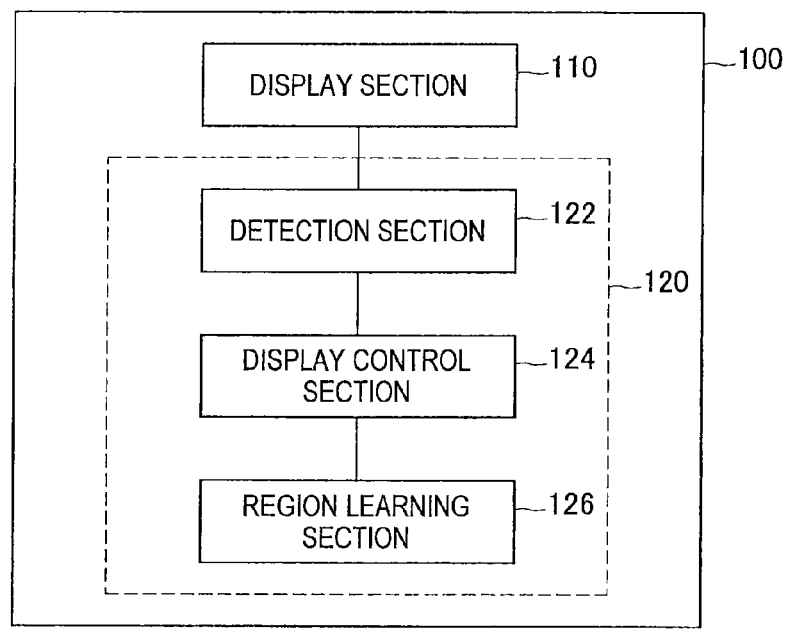
FIG. 19 is an explanatory diagram illustrating a modification of the information processing apparatus 100 according to an embodiment of the present disclosure.

Subsequently, a description is given of a modification of the information processing apparatus 100 according to an embodiment of the present disclosure. FIG. 19 is an explanatory diagram illustrating a modification of the information processing apparatus 100 according to an embodiment of the present disclosure.

FIG. 19 illustrates a configuration in which a region learning section 126 is added to the control section 120 having the configuration in FIG. 2 in the information processing apparatus 100. The region learning section 126 learns and thereby determines the holding region for disabling the scrolling operation. The region learning section 126 learns the holding region in various ways. In one of examples of the ways, the region learning section 126 acquires a contact position in a holding region set in advance, and learns which part the user tends to touch. Based on the part the user tends to touch, the region learning section 126 updates the holding region to be used by the display control section 124.

Figure 20:
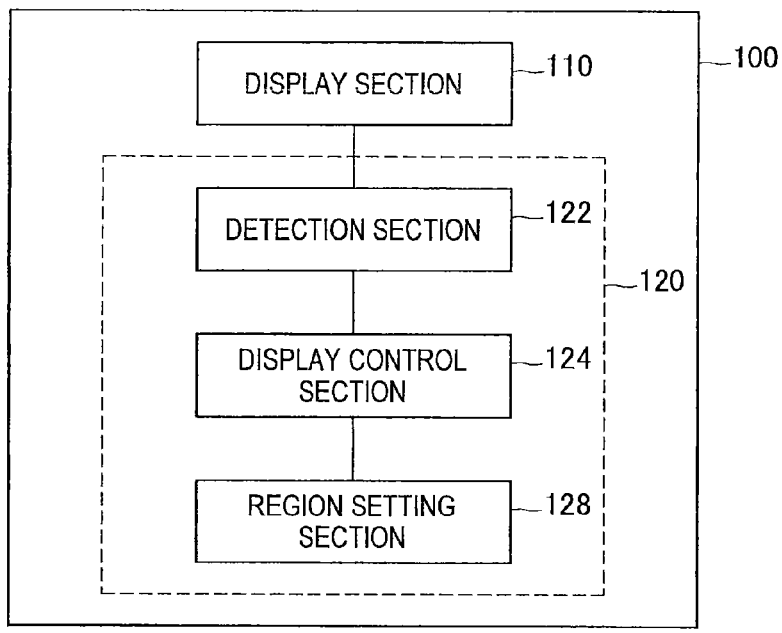
FIG. 20 is an explanatory diagram illustrating a modification of the information processing apparatus 100 according to an embodiment of the present disclosure.

FIG. 20 is an explanatory diagram illustrating another modification of the information processing apparatus 100 according to an embodiment of the present disclosure.

FIG. 20 illustrates a configuration in which a region setting section 128 is added to the control section 120 having the configuration in FIG. 2 in the information processing apparatus 100. The region setting section 128 sets the holding region to be used by the display control section 124, based on an action of setting the holding region by the user of the information processing apparatus 100. When the region setting section 128 sets the holding region designated by the user of the information processing apparatus 100, the display control section 124 thereby can execute control over the scrolling operation according to contact with the holding region designated by the user.

Note that the information processing apparatus 100 according to an embodiment of the present disclosure may include both the region learning section 126 in FIG. 19 and the region setting section 128 in FIG. 20.

Figure 21:
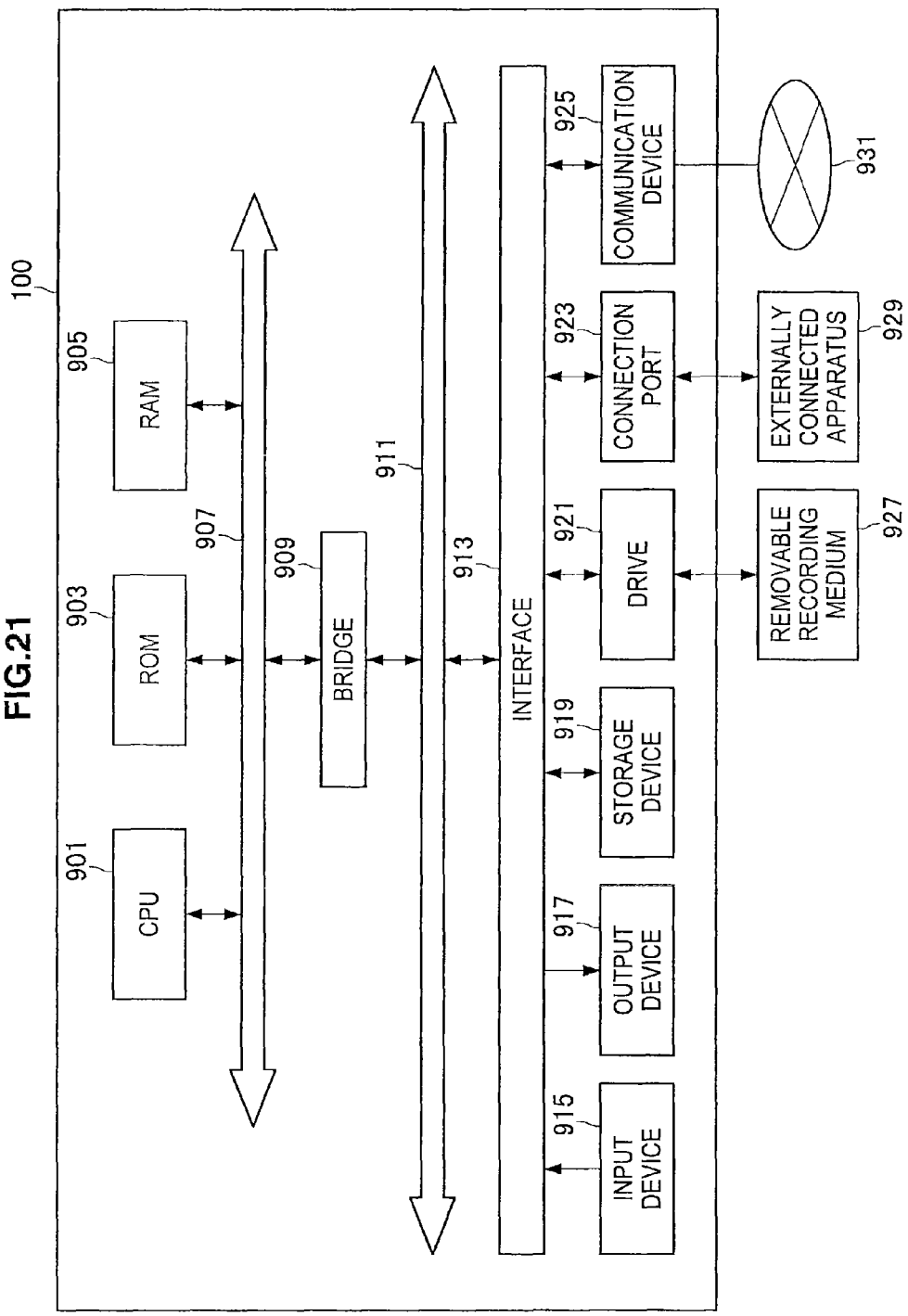
FIG. 21 is a block diagram illustrating a hardware configuration of the information processing apparatus 100 according to an embodiment of the present disclosure.

Next, a hardware configuration of the information processing apparatus 100 according to an embodiment of the present disclosure will be described in detail with reference to FIG. 21. FIG. 21 is a block diagram illustrating the hardware configuration of the information processing apparatus 100 according to an embodiment of the present disclosure.

The information processing apparatus 100 mainly includes a CPU 901, a ROM 903 and a RAM 905. In addition, the information processing apparatus 100 includes a host bus 907, a bridge 909, an external bus 911, an interface 913, an input device 915, an output device 917, a storage device 919, a drive 921, a connection port 923, and a communication device 925.

The CPU 901 serves as an operation processor and a controller, and controls all or some operations in the information processing apparatus 100 in accordance with various programs recorded in the ROM 903, the RAM 905, the storage device 919 or a removable recording medium 927. The ROM 903 stores programs, operation parameters, or the like which are used by the CPU 901. The RAM 905 primarily stores programs which are used by the CPU 901 and parameters which are appropriately modified in the execution of the programs, or the like. These component members are mutually connected via the host bus 907 made of an internal bus such as a CPU bus.

The host bus 907 is connected to the external bus 911 such as a PCI (Peripheral Component Interconnect/Interface) bus via the bridge 909.

The input device 915 may be an operation device which is operated by a user, such as a mouse, a keyboard, a touch panel, buttons, switches and a lever. The input device 915 may be, for example, a remote control unit (a so-called remote control) using infrared light or other radio waves, or may be an external connection device 929 such as a mobile phone and a PDA operable in response to the operation of the information processing apparatus 100. Further, the input device 915 includes, for example, an input control circuit which generates an input signal based on information inputted by a user with use of the above-stated operation device and which outputs the input signal to the CPU 901. By operating the input device 915, the user of the information processing apparatus 100 can input various kinds of data into the information processing apparatus 100, and can instruct processing operation.

The output device 917 includes a device capable of visually or audibly notifying the user of acquired information. Examples of such a device include: a display device such as a CRT display device, an LCD device, a plasma display device, an EL display device, and a lamp; a speech output device such as a speaker and a headphone set; a printer; a mobile phone; and a facsimile. The output device 917 outputs, for example, a result obtained by various processings executed by the information processing apparatus 100. More specifically, the display device displays a result obtained by various processings executed by the information processing apparatus 100 in the form of a text or an image. The speech output device converts an audio signal made of reproduced voice data, sound data, or the like into an analog signal, and outputs the analog signal.

The storage device 919 is a device for data storage which is configured as an example of a storage section of the information processing apparatus 100. The storage device 919 includes, for example, a magnetic storage device such as a HDD (hard disk drive), a semiconductor storage device, an optical storage device, or a magneto-optical storage device. The storage device 919 stores programs and various data to be executed by the CPU 901, various data obtained from the outside, and the like.

The drive 921 is a reader writer for recording media, which is incorporated in or externally attached to the information processing apparatus 100. The drive 921 reads information recorded on the attached removable recording medium 927, such as a magnetic disc, an optical disc, a magneto-optical disc, and a semiconductor memory device, and outputs the read information to the RAM 905. The drive 921 can also write data in the attached removable recording medium 927, such as a magnetic disc, an optical disc, a magneto-optical disc, and a semiconductor memory device. The removable recording medium 927 includes, for example, DVD media, HD-DVD media, Blu-ray media, and the like. The removable recording medium 927 may be a compact flash (registered trademark) (CompactFlash, CF), a flash memory, an SD memory card (secure digital memory card), or the like. The removable recording medium 927 may also be, for example, an IC card (integrated circuit card) or an electronic device that incorporates a noncontact IC chip, and the like.

The connection port 923 is a port used to directly connect devices to the information processing apparatus 100. One example of the connection port 923 includes a USB (universal serial bus) port, an IEEE1394 port, and an SCSI (small computer system interface) port. Another example of the connection port 923 may include an RS-232C port, an optical audio terminal, and an HDMI (high-definition multimedia interface) port. By connecting the external connection device 929 to the connection port 923, the information processing apparatus 100 directly acquires various kinds of data from the external connection device 929, or provides the external connection device 929 with various kinds of data.

The communication device 925 is, for example, a communication interface including a communication device or the like for connection to the communication network 2. The communication device 925 may be, for example, a communication card for a wired or wireless LAN (local area network), Bluetooth (registered trademark), or WUSB (wireless USB), and the like. In addition, the communication device 925 may be a router for optical communication, a router for ADSL (asymmetric digital subscriber line), a modem for various kinds of communications, or the like. The communication device 925 can transmit and receive signals and the like to and from, for example, the Internet or other communication devices based on a predetermined protocol such as TCP/IP. In addition, the communication network 2 connected to the communication device 925 may be made of a network connected in a wired or wireless manner or the like, and may be, for example, the Internet, a home LAN, infrared communication, radio wave communication, satellite communication, or the like.

In the foregoing, one example of the hardware configuration which can implement the function of the information processing apparatus 100 according to an embodiment of the present disclosure has been shown. Each of the above-stated component members may be configured with use of general-purpose components, and may be configured by hardware having a specialized function of each component member. Therefore, it is possible to suitably modify the hardware configuration to be used in accordance with the skill level at the time of implementation of the present embodiment.

In the hardware configuration example illustrated in FIG. 21 for implementing the information processing apparatus 100 according to an embodiment of the present disclosure, for example, the display section 110 corresponds to the output device 917; the detection section 122, the input device 915; and the control section 120, the CPU 901. In addition, for example, a computer program executed by the CPU 901 implements functions of the display control section 124, the region learning section 126, and the region setting section 128, respectively.

2. Conclusion

As described above, the information processing apparatus 100 according to an embodiment of the present disclosure can set the holding region for disabling the scrolling operation of the display section 110. When the detection section 122 detects contact with the holding region during the handwriting input using the stylus 200 or the like, the display control section 124 thereby disables the scrolling operation of the display section 110. By controlling the scrolling operation of the display section 110 in this way, the information processing apparatus 100 according to an embodiment of the present disclosure can enhance the user-friendliness in handwriting input on the screen and provide the user with the feeling similar to that in writing on paper.

Note that in the descriptions above, the display control section 124 controls the scrolling operation of the display section 110 on condition that contact with the touch panel is detected, but the present disclosure is not limited to the example. The display control section 124 may control the scrolling operation of the display section 110 on condition that, instead of contact with the touch panel, a proximity state of approaching the touch panel in a distance shorter than a predetermined distance is detected.

In addition, in the descriptions above, the display control section 124 controls the scrolling operation of the display section 110, but the present disclosure is not limited to the example. For example, the display control section 124 may include pinching manipulation, flicking manipulation, and the like in an action to be prohibited upon detection of contact with the holding region.

In the case where contact with the holding region with the hand or the finger is detected, when the contact position moves, that is, when the hand or the finger moves on the display section 110, the information processing apparatus 100 according to an embodiment of the present disclosure may control the scrolling operation so that the screen is scrolled in the direction of the movement. At this time, if the moving speed of the contact position per unit hour is equal to or higher than a predetermined threshold, it may be judged that the user intends to perform scrolling. The display control section 124 may enable the scrolling operation of the display section 110 even in the case where contact with the holding region with the hand or the finger is detected. On the contrary, if the moving speed of the contact position per unit hour is lower than the predetermined threshold, the display control section 124 may enable the scrolling operation on the following condition that another member contacts or approaches the display section 110 and the member executes the scrolling operation on the display section 110. Moreover, when the scrolling operation of the display section 110 is enabled in the state where contact with the holding region with the hand or finger is detected, the display control section 124 may control the scrolling operation of the display section 110 so that the scrolling is performed at lower speed than in a case where the contact with the holding region is not detected.

Further, when a plurality of contact positions are detected and any of the contact positions moves, the information processing apparatus 100 according to an embodiment of the present disclosure may control the scrolling operation so that the scrolling is performed in the direction of the movement. Here, when the plurality of contact positions each move in different directions, for example, when the contact positions move in such a manner as to approach each other, the display control section 124 may display a crease-like pattern on the display section 110 as if real paper creased. On the other hand, when the contact positions move away from each other, the display control section 124 may perform no control. By controlling the display on the display section 110 in this way, the information processing apparatus 100 according to an embodiment of the present disclosure can provide usability close to that of real paper.

Note that when the plurality of contact positions are detected and when contact with the holding region is detected, the information processing apparatus 100 according to an embodiment of the present disclosure may control the display on the display section 110 so that the screen is rotated around the contact position in the holding region. For example, when the user touches the holding region with the left hand and the display section 110 with the right hand, and moves the right hand, the display control section 124 may control the display on the display section 110 so that the display is rotated around the contact position in the holding region in accordance with the movement of the other contact position.

In addition, when the user presses a hard key, the information processing apparatus 100 according to an embodiment of the present disclosure may cause the display control section 124 to disable the scrolling operation of the display section 110, regardless of whether or not the holding manipulation of the holding region is performed.

It should be understood by those skilled in the art that various modifications, combinations, sub-combinations and alterations may occur depending on design requirements and other factors insofar as they are within the scope of the appended claims or the equivalents thereof.

For example, it may not be necessary to chronologically execute respective steps in the processing, which is executed by each apparatus of this specification, in the order described in the sequence diagrams or the flow charts. For example, the respective steps in the processing which is executed by each apparatus may be processed in the order different from the order described in the flow charts, and may also be processed in parallel.

Furthermore, it becomes possible to generate a computer program which makes a hardware device, such as a CPU, a ROM, and a RAM incorporated in each apparatus demonstrate the functions equivalent to the configurations of the above described apparatuses. It becomes also possible to provide a storage medium which stores the computer program. In addition, respective functional blocks shown in the functional block diagrams may be constituted from hardware devices, so that a series of processings may be implemented by the hardware devices.

Additionally, the present technology may also be configured as below.

(1) A display control apparatus including:

a detection section which detects contact or proximity of a member with or to a display section which displays information; and a display control section which controls displaying of the information on the display section, wherein in a state where the detection section detects contact with or proximity to a predetermined region of the display section continuously performed by a first member for a predetermined time period, the display control section controls scrolling display on the display section according to whether or not the detection section detects contact with or proximity to the display section performed by a second member different from the first member.

(2) The display control apparatus according to (1), wherein in a state where the detection section detects the contact with or the proximity to the predetermined region of the display section performed by the first member, the contact or the proximity moving at a speed lower than a predetermined speed, the display control section controls the scrolling display on the display section according to whether or not the detection section detects the contact with or the proximity to the display section performed by the second member different from the first member.

(3) The display control apparatus according to (1) or (2), wherein the predetermined region is a region provided along a right or left side of the display section.

(4) The display control apparatus according to any one of (1) to (3), wherein the predetermined region is a region provided along a corner portion of the display section.

(5) The display control apparatus according to any one of (1) to (4), wherein the predetermined region is a region set in a region of the display section where information is not displayed.

(6) The display control apparatus according to (5),
wherein the predetermined region is a region which is a predetermined distance away from a range where information is displayed in the display section.
(7) The display control apparatus according to (1),
wherein the predetermined region is a region set inside a predetermined information display region displayed in the display section.
(8) The display control apparatus according to (7),
wherein the predetermined region is a region provided along a right or left side of the predetermined information display region.
(9) The display control apparatus according to (7) or (8),
wherein the predetermined region is a region provided along a corner portion of the predetermined information display region.
(10) The display control apparatus according to any one of (1) to (9),
wherein the display control section causes the display section to display the predetermined region in such a manner as to discriminate the predetermined region from a region other than the predetermined region.
(11) The display control apparatus according to any one of (1) to (10), further including a region learning section which learns a position where the detection section detects the contact or the proximity of the first member and which determines the predetermined region.
(12) The display control apparatus according to any one of (1) to (11), further including a region setting section which sets the predetermined region.
(13) The display control apparatus according to any one of (1) to (12),
wherein when enabling the scrolling display on the display section in the state where the detection section detects the contact with or the proximity to the predetermined region of the display section continuously performed by the first member for the predetermined time period, the display control section causes the scrolling display at a speed lower than a speed in scrolling display performed in a state where the detection section does not detect the contact or the proximity of the first member.
(14) A display control method including:
detecting contact or proximity of a member with or to a display section which displays information; and
controlling displaying of the information on the display section,
wherein in the display control step, in a state where contact with or proximity to a predetermined region of the display section continuously performed by a first member for a predetermined time period is detected in the detection step, scrolling display on the display section is controlled according to whether or not contact with or proximity to the display section performed by a second member different from the first member is detected in the detection step.
(15) A computer program causing a computer to execute:
detecting contact or proximity of a member with or to a display section which displays information; and
controlling displaying of the information on the display section,
wherein in the display control step, in a state where contact with or proximity to a predetermined region of the display section continuously performed by a first member for a predetermined time period is detected in the detection step, scrolling display on the display section is controlled according to whether or not contact with or proximity to the display section performed by a second member different from the first member is detected in the detection step.

The present disclosure contains subject matter related to that disclosed in Japanese Priority Patent Application JP 2012-171092 filed in the Japan Patent Office on Aug. 1, 2012, the entire content of which is hereby incorporated by reference.

What is claimed is:
1. A display control apparatus, comprising:
a detection circuit configured to detect contact or proximity of a member to a display; and
a display control circuit configured to
control the display to display information,
acquire a display position of input by a user of the display;
set a holding region of the display to be a first region that does not display the information, the first region being set a predetermined distance away from the acquired display position where at least one input by the user of the display is displayed,
change the holding region from the first region to a second region that does not display the information within the display, the second region being selected by the user of the display,
determine, when the detection circuit detects contact or proximity of a first member to the holding region, whether the contact or the proximity of the first member to the holding region is for less than a predetermined time period,
enable a scrolling state when the detection circuit detects the contact or the proximity of the first member to the holding region and the contact or the proximity of the first member to the holding region is for less than the predetermined time period,
disable the scrolling state when the detection circuit detects the contact or the proximity of the first member to the holding region and the contact or the proximity of the first member to the holding region is for greater than or equal to the predetermined time period,
control scrolling of the display, when the scrolling state is enabled, according to detection by the detection circuit of contact or proximity of a second member to the display, and
distinguish between the second member performing a write operation by a stylus and a contact by a hand of the user, the write operation disabling scrolling of the display and allowing the user to write with the stylus in the second region.
2. The display control apparatus according to claim 1, wherein the detection circuit is configured to detect the contact or the proximity of the first member to the holding region when the first member moves at a speed that is less than a predetermined speed.
3. The display control apparatus according to claim 1, wherein the second region is provided along a side of the display.
4. The display control apparatus according to claim 1, wherein the second region is provided along a corner portion of the display.
5. The display control apparatus according to claim 1, wherein the second region is set in a region of the display where information is not displayed.
6. The display control apparatus according to claim 5, wherein the second region is a region which is a predetermined distance away from a range where information is displayed in the display.

7. The display control apparatus according to claim 1, wherein the second region is set inside a predetermined information display region displayed in the display.

8. The display control apparatus according to claim 7, wherein the second region is provided along a side of the predetermined information display region.

9. The display control apparatus according to claim 7, wherein the second region is provided along a corner portion of the predetermined information display region.

10. The display control apparatus according to claim 1, wherein the display control circuit is configured to control the display to display the holding region in such a manner as to discriminate the predetermined region from a region other than the predetermined region.

11. The display control apparatus according to claim 1, wherein the display control circuit is configured to
record a series of previously detected contact positions of the first member with the display section, and
set the holding region based on the recorded contact positions of the first member.

12. The display control apparatus according to claim 1, wherein
the display control circuit is configured to control the scrolling of the display at a first speed when the scrolling state is enabled and the detection circuit detects the contact or the proximity of the first member to the display,
the display control circuit is configured to control the scrolling of the display at a second speed when the scrolling state is enabled and the detection circuit does not detect the contact or the proximity of the first member, and
the first speed is slower than the second speed.

13. A display control method of a display control apparatus, comprising:
detecting contact or proximity of a member to a display;
controlling the display to display information;
acquiring a display position of input by a user of the display;
setting a holding region of the display to be a first region that does not display the information, the first region being set a predetermined distance away from the acquired display position where at least one input by the user of the display is displayed;
changing the holding region from the first region to a second region that does not display the information within the display, the second region being selected by the user of the display;
determining, by circuitry, when contact or proximity of a first member is detected to the holding region, whether the contact or the proximity of the first member to the holding region is for less than a predetermined time period;
enabling a scrolling state when the contact or the proximity of the first member to the holding region is detected and the contact or the proximity of the first member to the holding region is determined to be for less than the predetermined time period;
disabling the scrolling state when the contact or the proximity of the first member to the holding region is detected and the contact or the proximity of the first member to the holding region is determined to be for greater than or equal to the predetermined time period;
controlling scrolling of the display, when the scrolling state is enabled, according to whether or not contact or proximity of a second member to the display is detected; and
distinguishing between the second member performing a write operation by a stylus and a contact by a hand of the user, the write operation disabling scrolling of the display and allowing the user to write with the stylus in the second region.

14. The display control method according to claim 13, wherein the contact or the proximity of the first member to the holding region is detected when the first member moves at a speed that is less than a predetermined speed.

15. The display control method according to claim 13, wherein the second region is set inside a predetermined information display region displayed in the display.

16. The display control method according to claim 15, wherein the second region is provided along a side of the predetermined information display region.

17. The display control method according to claim 15, wherein the second region is provided along a corner portion of the predetermined information display region.

18. The display control method according to claim 13, wherein
the scrolling of the display is at a first speed when the scrolling state is enabled and the contact or the proximity of the first member to the display is detected,
the scrolling of the display is at a second speed when the scrolling state is enabled and the contact or the proximity of the first member to the display is not detected, and
the first speed is slower than the second speed.

19. A non-transitory computer readable medium that stores computer executable instructions that, when executed by a computer, causes the computer to:
detect contact or proximity of a member to a display;
control the display to display information;
acquire a display position of input by a user of the display;
set a holding region of the display to be a first region that does not display the information, the first region being set a predetermined distance away from the acquired display position where at least one input by the user of the display is displayed;
change the holding region from the first region to a second region that does not display the information within the display, the second region being selected by the user of the display;
determine, when contact or proximity of a first member is detected to the holding region, whether the contact or the proximity of the first member to the holding region is for less than a predetermined time period;
enable a scrolling state when the contact or the proximity of the first member to the holding region is detected and the contact or the proximity of the first member to the holding region is determined to be for less than the predetermined time period;
disable the scrolling state when the contact or the proximity of the first member to the holding region is detected and the contact or the proximity of the first member to the holding region is determined to be for greater than or equal to the predetermined time period;
control scrolling of the display when the scrolling state is enabled, according to whether or not contact or proximity of a second member to the display is detected; and
distinguishing between the second member performing a write operation by a stylus and a contact by a hand of the user, the write operation disabling scrolling of the display and allowing the user to write with the stylus in the second region.

* * * * *